(12) United States Patent
Muramatsu et al.

(10) Patent No.: US 7,463,640 B2
(45) Date of Patent: Dec. 9, 2008

(54) SELF-SYNCHRONOUS FIFO MEMORY DEVICE

(75) Inventors: Tsuyoshi Muramatsu, Nara (JP); Hidekazu Yamanaka, Tenri (JP); Atsushi Tokura, Tenri (JP); Takuji Urata, Yamatokooriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1131 days.

(21) Appl. No.: 10/636,698

(22) Filed: Aug. 8, 2003

(65) Prior Publication Data

US 2004/0027909 A1 Feb. 12, 2004

(30) Foreign Application Priority Data

Aug. 8, 2002 (JP) ............................. P2002-231787

(51) Int. Cl.
*H04L 12/28* (2006.01)
(52) U.S. Cl. ........................................ 370/412; 712/225
(58) Field of Classification Search ................. 370/412, 370/413, 419, 420, 421, 422, 429, 432, 437, 370/439, 416, 462, 471, 383, 392, 382, 907; 711/167, 100, 154; 326/93; 712/225
See application file for complete search history.

(56) References Cited

U.S. PATENT DOCUMENTS

| | | | | |
|---|---|---|---|---|
| 6,546,065 B1 * | 4/2003 | Shimosakoda | ............... | 375/364 |
| 6,819,140 B2 * | 11/2004 | Yamanaka et al. | ............ | 326/93 |
| 6,912,637 B1 * | 6/2005 | Herbst | ......................... | 711/167 |
| 6,941,434 B2 * | 9/2005 | Uneyama et al. | ............ | 711/167 |
| 6,982,995 B2 * | 1/2006 | Acimovic | ................... | 370/518 |
| 7,058,064 B2 * | 6/2006 | Nemirovsky et al. | ..... | 370/395.7 |
| 7,120,214 B2 * | 10/2006 | Takata | ........................ | 375/354 |
| 2001/0028629 A1 * | 10/2001 | Uneyama et al. | ............ | 370/205 |

FOREIGN PATENT DOCUMENTS

JP 2000-11636 A 1/2000

* cited by examiner

*Primary Examiner*—Chi H. Pham
*Assistant Examiner*—Alexander Boakye
(74) *Attorney, Agent, or Firm*—Birch, Stewart, Kolasch & Birch, LLP

(57) ABSTRACT

A self-synchronous FIFO memory device (100) has a structure in which n self-synchronous data transmission lines (111-11n) are arrayed in parallel. An input control section (101) selects one of the n self-synchronous data transmission lines, and mediates the reception and delivery of a first transfer request signal, a first acknowledge (transfer instruction) signal and data between the selected self-synchronous data transmission line and a self-synchronous data transmission line of a preceding-stage section. Further, an output control section (102) selects one of the n self-synchronous data transmission lines, and mediates the reception and delivery of a second transfer request signal, a second acknowledge (transfer instruction) signal and data between the selected self-synchronous data transmission line and a self-synchronous data transmission line of a succeeding-stage section.

21 Claims, 10 Drawing Sheets

SELF-SYNCHRONOUS FIFO MEMORY DEVICE

This nonprovisional application claims priority under 35 U.S.C. §119(a) on Patent Application No(s). 2002-231787 filed in JAPAN on Aug. 8, 2002, which is (are) herein incorporated by reference.

BACKGROUND OF THE INVENTION

The present invention relates to self-synchronous FIFO (First-In First-Out) memory devices and, in particular, to a self-synchronous FIFO memory device equipped with a control circuit for transmitting an input signal or output signal of a self-synchronous signal control circuit that controls a FIFO memory device.

Logic circuits that perform pipeline data processing in synchronization with a clock are, normally, implemented as logic LSIs. These logic LSIs have been under year-by-year developments to high speed, larger scale, and further microfabrication, with elongation of wiring length and reduction in spacing between wirings, so that series resistance of wirings and parallel capacitance between other wirings have been increasing more and more.

For this reason, signal delay and waveform rounding have been becoming larger, the influence of which would vary depending on the length of wirings, i.e. interconnect lines. Unfortunately, however, it is difficult to uniformize the lengths of interconnect lines to all flip-flops arranged randomly on the overall chip, making it harder and harder to achieve the distribution of an in-phase single clock.

Avoiding this problem would involve, for example, generating a clock tree in which buffers are arranged in a multi-stage tree structure for implementing a constant delay for the overall chip, which would lead to an increase in cost. Therefore, under discussions are logic circuits having a self-synchronous pipeline that allows local synchronization between neighboring pipeline registers to be maintained and that eliminates the need for an in-phase single clock.

In this self-synchronous pipeline, when data transfer is temporarily halted at an output end of the pipeline for the reason that succeeding-stage device is in a state of being unable to receive output data from the pipeline or another reason, data transfer is forced to be halted chainedly toward an input end of the pipeline, followed by a standby state lasting until data transfer at the output end of the pipeline is enabled again.

During this process, data within the pipeline flowing normally at some intervals are brought more compact in their intervals, thus the pipeline showing an autonomous buffer capacity. However, when the case is beyond the buffer capacity, there would occur a state that data reception at the input end of the pipeline is temporarily disabled. In this case, it is desirable that a FIFO memory device be inserted into the pipeline to reinforce the buffer capacity.

FIG. 8 shows an example of a FIFO memory device utilizing autonomous buffer capacity of such a self-synchronous pipeline. In FIG. 8, a FIFO memory device 800 includes three self-synchronous data transmission lines 811, 812, 813, and these self-synchronous data transmission lines 811, 812, 813 include pipeline registers 801, 802, 803, respectively. As a result of this, the FIFO memory device 800 is enabled to hold a maximum of three pieces of data.

Also, the three self-synchronous data transmission lines 811, 812, 813 of the FIFO memory device 800 include self-synchronous signal control circuits 804, 805, 806, respectively. These three self-synchronous signal control circuits 804, 805, 806, while handshaking each other, feed clocks to the pipeline registers 801, 802, 803.

As shown above, the self-synchronous data transmission lines 811, 812, 813 are each made up of a set of one self-synchronous signal control circuit 804, 805, 806 and one pipeline register 801, 802, 803 which operates with a clock that the self-synchronous signal control circuit 804, 805, 806 feeds. As shown in FIG. 8, the self-synchronous data transmission lines 811, 812, 813 are connected in series, by which the FIFO memory device 800 is implemented.

Next, FIG. 9 shows one configuration example of one of the self-synchronous signal control circuits 804, 805, 806 in the FIFO memory device 800 of FIG. 8. As shown in FIG. 9, the self-synchronous signal control circuit includes a CI signal terminal 901, an RO signal terminal 902, a CP output terminal 903, a CO output terminal 904 and an RI input terminal 905, and further includes an RS flip-flops 906, 908 and a four-input NAND gate 907 which is a logic circuit.

A transfer request signal of the preceding stage is inputted to the CI signal terminal 901, and the RO signal terminal 902 returns to the preceding stage an acknowledge signal showing the reception of the transfer request signal from the CI signal terminal 901. Also, the CP signal terminal 903 transmits clock pulses to the pipeline registers 801 to 803 according to the transfer request signal from the CI signal terminal 901.

The CO output terminal 904 transfers the transfer request signal from the preceding stage to the succeeding stage. Also, to the RI signal terminal 905 is returned an acknowledge signal showing that the transfer request from the CO signal terminal 904 has been received by the succeeding stage. Further, the RS flip-flop 906 holds a transfer request acceptance state, while the RS flip-flop 908 holds a transfer request state for the succeeding stage. Further, the four-input NAND gate 907 maintains synchronization of the RS flip-flop 906 and the RS flip-flop 908.

Next, a timing chart of FIG. 10 shows an example of the signal for activating a self-synchronous pipeline partly composed of the FIFO memory device 800 of FIG. 8. A pulse of a transfer request signal 804CI is inputted to a CI signal terminal CI of the self-synchronous signal control circuit 804 forming the first stage of the pipeline in the FIFO memory device 800 of FIG. 8. Similarly, processing data 801D is inputted to a data terminal D of the first-stage pipeline register 801.

As a result, the RS flip-flop 906 for holding the transfer request acceptance state in the self-synchronous signal control circuit 804 is set, and an acknowledge signal 804RO is returned to the Self-synchronous signal control circuit of the preceding-stage FIFO memory device from an RO signal terminal RO of the self-synchronous signal control circuit 804. As a result of this, the transfer request signal 804CI returns to the H (High) level while a signal 804NAND goes L (Low) level, so that the RS flip-flop 908 for holding a transfer request to the succeeding stage is set and the RS flip-flop 906 is cleared.

Next, a clock 804CP for the pipeline register 801 goes H level, by which data is latched to the pipeline register 801 and this data is outputted to a terminal Q of the pipeline register 801. Also, a transfer request pulse 804CO for the succeeding stage is outputted from a terminal CO of the self-synchronous signal control circuit 804. This transfer request pulse 804CO is inputted to the self-synchronous signal control circuit 805 forming the second-stage self-synchronous data transmission line 812 composing the pipeline of FIG. 8. Likewise, a signal 804RI, a signal 805NAND, a signal 805CP and a signal 805CO are generated, and a signal 801Q is latched by the second-stage pipeline register 802 and outputted to the terminal Q.

Similar operations are performed between the self-synchronous signal control circuit 805 and the self-synchronous signal control circuit 806, by which a data signal 802Q is latched by the third-stage pipeline register 803 and outputted from the terminal Q of the pipeline register 803 to the data path output.

Meanwhile, a FIFO memory device intended for insertion into a self-synchronous pipeline has to be capable of processing asynchronous two requests of data write and read in parallel and moreover capable of processing at the same speed as the other parts of the self-synchronous pipeline.

Also, in the case where data is held in this FIFO memory device, a control mechanism for spontaneously generating a data transfer request is indispensable. Further, the FIFO memory device is expected to substantially increase the physical storage capacity without increasing the delay time that is simply proportional to the depth of the pipeline. Furthermore, in order to implement an optimum FIFO memory device for pipeline processing, it is desirable that the FIFO memory device can change the storage capacity dynamically and statically.

The above FIFO memory device 800 of the related art, in which the self-synchronous data transmission lines 811, 812, 813 are connected to one another in cascade, is capable of processing two asynchronous requests of write and read in parallel, while the cascade-connection structure of the self-synchronous data transmission lines 811-813 deepens the pipeline so that the delay time would be increased in simple proportion to the depth of the pipeline.

In this connection, although intended for use other than the insertion into a self-synchronous pipeline to reinforce the buffer capacity, there has been disclosed, as a similar technique, an asynchronous FIFO memory device (Japanese Patent Laid-Open Publication 2000-11636). This asynchronous FIFO memory device is a FIFO memory device for performing data input and output asynchronously with external devices.

However, this related-art asynchronous FIFO memory device, which is placed intermediate between external write processor and read processor, is purposed to passively respond to write requests or read requests transmitted from those active processors. As a result of this, the asynchronous FIFO memory device is incapable of spontaneously generating a transfer request delay time simply proportional to the depth of the pipeline, is incapable of processing asynchronous requests of write and read in parallel while ensuring normal operations in a critical state in the case where the FIFO memory device is emptied or where there is no empty space left or other cases. Furthermore, in this related art technique, the asynchronous FIFO memory device will not execute data output until it receives an output request from an external processor, so that the FIFO memory device is incapable of spontaneously generating a data transfer request. From these and other constraints, it is difficult to insert the asynchronous FIFO memory device into a self-synchronous pipeline.

SUMMARY OF THE INVENTION

Accordingly, a feature of the present invention is to provide a self-synchronous FIFO memory device which is capable of substantially increasing the physical storage capacity without increasing the delay time and moreover capable of processing two asynchronous requests of write and read in parallel.

In order to achieve the above feature, the self-synchronous FIFO memory device of the present invention has a plurality of self-synchronous data transmission lines each composed of a self-synchronous signal control circuit and a data hold circuit. The plurality of self-synchronous data transmission lines are connected in parallel, forming a parallel structure. The FIFO memory device further has an input control section and an output control section. The input control section selects one of the self-synchronous data transmission lines contained in the parallel structure, then outputs to the selected self-synchronous data transmission line a first transfer request signal inputted from a preceding-stage section, and outputs to the preceding-stage section a first acknowledge signal outputted from the selected self-synchronous data transmission line, and further, given a state that data transfer toward the selected self-synchronous data transmission line is enabled, outputs, to the selected self-synchronous data transmission line, input data inputted from the preceding-stage section.

Also, the output control section selects one of the self-synchronous data transmission lines contained in the parallel structure and then outputs to a succeeding-stage section a second transfer request signal outputted from the selected self-synchronous data transmission line, and outputs to the selected self-synchronous data transmission line a second acknowledge signal inputted from the succeeding-stage section, and further, given a state that data transfer toward the succeeding-stage section is enabled, outputs, to the succeeding-stage section, output data outputted from the selected self-synchronous data transmission line.

The FIFO memory device of this invention has a structure that a plurality of self-synchronous data transmission lines are arrayed in parallel. This plurality of self-synchronous data transmission lines are used as element devices for data transmission and data hold.

Also, immediately before the parallelly-provided self-synchronous data transmission lines, the FIFO memory device has an input control section. This input control section selects one of the parallelly-provided self-synchronous data transmission lines, and mediates the reception and delivery of a transfer request signal, a transfer instruction signal (acknowledge signal) and data between the selected self-synchronous data transmission line and the self-synchronous data transmission line of the preceding-stage section. Further, immediately after the parallelly-provided self-synchronous data transmission lines, the FIFO memory device has an output control section. This output control section selects one of the parallelly-provided self-synchronous data transmission lines, and mediates the reception and delivery of a transfer request signal, a transfer instruction signal (acknowledge signal) and data between the selected self-synchronous data transmission line and the self-synchronous data transmission line of the succeeding-stage section.

Thus, according to the FIFO memory device of this invention, there can be implemented a FIFO memory device which has the same functions as that of the related art even without any data path of cascade passage through self-synchronous data transmission lines, as compared with the self-synchronous FIFO memory device shown in the related art in which data transmission lines are connected in series.

Consequently, in this invention, since the self-synchronous data transmission lines are arranged in parallel, it becomes implementable to perform data input or output by one-time data transfer for an arbitrary self-synchronous data transmission line. Therefore, in this invention, unlike the related-art FIFO memory device in which self-synchronous data transmission lines are arrayed in series, it never occurs that the delay time increases in simple proportion to the maximum storage capacity. Therefore, according to this invention, the physical storage capacity can be substantially increased without increasing the delay time, and moreover, two asynchronous requests of write and read can be processed in parallel.

In the FIFO memory device of one embodiment, the input control section has a sequencer. This sequencer selects a transmission path for the first transfer request signal toward the self-synchronous data transmission lines forming the parallel structure as well as a transmission path for the first acknowledge signal derived from the self-synchronous data transmission lines forming the parallel structure, and further distributes the input data to the self-synchronous data transmission lines forming the parallel structure. In this embodiment, the input control section can be implemented with a simple circuit construction by virtue of the input control section having the sequencer.

In this embodiment, which is selected out of the parallelly-provided self-synchronous data transmission lines is determined by the sequencer provided inside the input control section. The sequencer is driven by a signal inputted from the self-synchronous data transmission line of the preceding-stage section, independently of the internal state of the FIFO memory device.

Also, in the FIFO memory device of one embodiment, the input control section further includes at an input stage a self-synchronous data transmission line composed of a self-synchronous signal control circuit and a data hold circuit. The self-synchronous data transmission line transfers the first transfer request signal and the first acknowledge signal between the preceding-stage section outer than the input control section and an internal circuit containing the sequencer of the input control section.

In this embodiment, since the input control section includes the self-synchronous data transmission line, more reliable data transmission can be fulfilled without decreasing the data transfer rate.

Also, in the FIFO memory device of one embodiment, the output control section has a sequencer. This sequencer selects a transmission path for the second transfer request signal derived from the self-synchronous data transmission line forming the parallel structure as well as a transmission path for the second acknowledge signal toward the self-synchronous data transmission lines forming the parallel structure and further selects output data outputted from the self-synchronous data transmission lines forming the parallel structure. According to this embodiment, the output control section can be implemented with a simple circuit construction by virtue of the output control section having the sequencer.

In this embodiment, which is selected out of the parallelly-connected self-synchronous data transmission lines is determined by the sequencer provided inside the output control section. The sequencer is driven by a signal inputted from the self-synchronous data transmission line of the succeeding-stage section, independently of the internal state of the FIFO memory device.

It is noted that whereas the sequencer inside the input control section and the sequencer inside the output control section operate independently of each other, the order in which the parallelly-connected self-synchronous data transmission lines are selected on and on is desirably made identical for both sequencers. As a result of this, it becomes implementable to substantially increase the physical storage capacity with the number of stages dynamically variable and without increasing the delay time that is simply proportional to the depth of the pipeline.

Also, in the FIFO memory device of one embodiment, the output control section further includes at an output stage a self-synchronous data transmission line composed of a self-synchronous signal control circuit and a data hold circuit. Then, the self-synchronous data transmission line transfers the second transfer request signal and the second acknowledge signal between the succeeding-stage section outer than the output control section and an internal circuit containing the sequencer of the output control section.

In this embodiment, since the output control section includes the self-synchronous data transmission line, more reliable data transmission can be fulfilled without decreasing the data transfer rate.

Also, the FIFO memory device of one embodiment has an input terminal to which a storage capacity control signal for changing storable data amount is inputted.

In the invention of this embodiment, since the FIFO memory device has an input terminal to which a storage capacity control signal for changing the storable data amount is inputted, the number of stages of the FIFO memory device can be made statically variable. That is, the dynamically variable number of stages of the FIFO memory device (i.e., maximum storage capacity of FIFO memory device) is determined with the use of this storage capacity control signal.

From the standpoint of buffer function, the upper limit of the dynamically variable number of stages is desirably as large as possible. However, it may be still desirable, on the other hand, that the storage capacity of the FIFO memory device is not excessive for cases where the input to the pipeline should favorably be halted under stagnated output of the pipeline.

That is, in the self-synchronous pipeline, when the output of the pipeline is stagnated, data transfer is autonomously halted on and on from outlet toward inlet of the pipeline, so that the acknowledge signal is finally fixed to L level at the inlet of the pipeline, thus making it possible for the preceding-stage section to find that the pipeline is saturated. For such a purpose, it is desirable that the maximum storage capacity of the FIFO memory device is properly restricted.

Also, in the FIFO memory device of one embodiment, the input control section has a sequencer, and this sequencer selects a transmission path for the first transfer request signal as well as a transmission path for the first acknowledge signal and further distributes input data. Also, the sequencer has an input terminal for the storage capacity control signal.

In this embodiment, out of the parallelly-provided self-synchronous data transmission lines, only self-synchronous data transmission lines of a number designated by the storage capacity control signal are targeted for the selection by the sequencer provided inside the input control section.

Also, in the FIFO memory device of one embodiment, the output control section has a sequencer for selecting a transmission path for the second transfer request signal as well as a transmission path for the second acknowledge signal and further for selecting the output data, and this sequencer has an input terminal for the storage capacity control signal.

In this embodiment, out of the parallelly-provided self-synchronous data transmission lines, only self-synchronous data transmission lines of a number designated by the storage capacity control signal are targeted for the selection by the sequencer provided inside the output control section.

It is noted that, for the input of the storage capacity control signal to the input control section and the output control section, the selection-targeted set of self-synchronous data transmission line, as well as the order of selection thereamong, are made identical for both the sequencer inside the input control section and the sequencer inside the output control section. As a result of this, it becomes implementable to properly restrict the maximum storage capacity of the FIFO memory device according to its application without adding any complex mechanism.

With the above-described means, there can be implemented a FIFO memory device the number of stages of which is dynamically and statically variable, making it possible to obtain a FIFO memory device which can be easily inserted into a self-synchronous pipeline and which is best suited for application systems and internal pipeline processing of the present invention. That is, there can be implemented a FIFO memory device capable of substantially increasing the physical storage capacity without increasing the delay time that is simply proportional to the depth of the pipeline.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

Hereinbelow, the present invention is described in detail by embodiments thereof illustrated in the accompanying drawings.

First Embodiment

Figure 1:
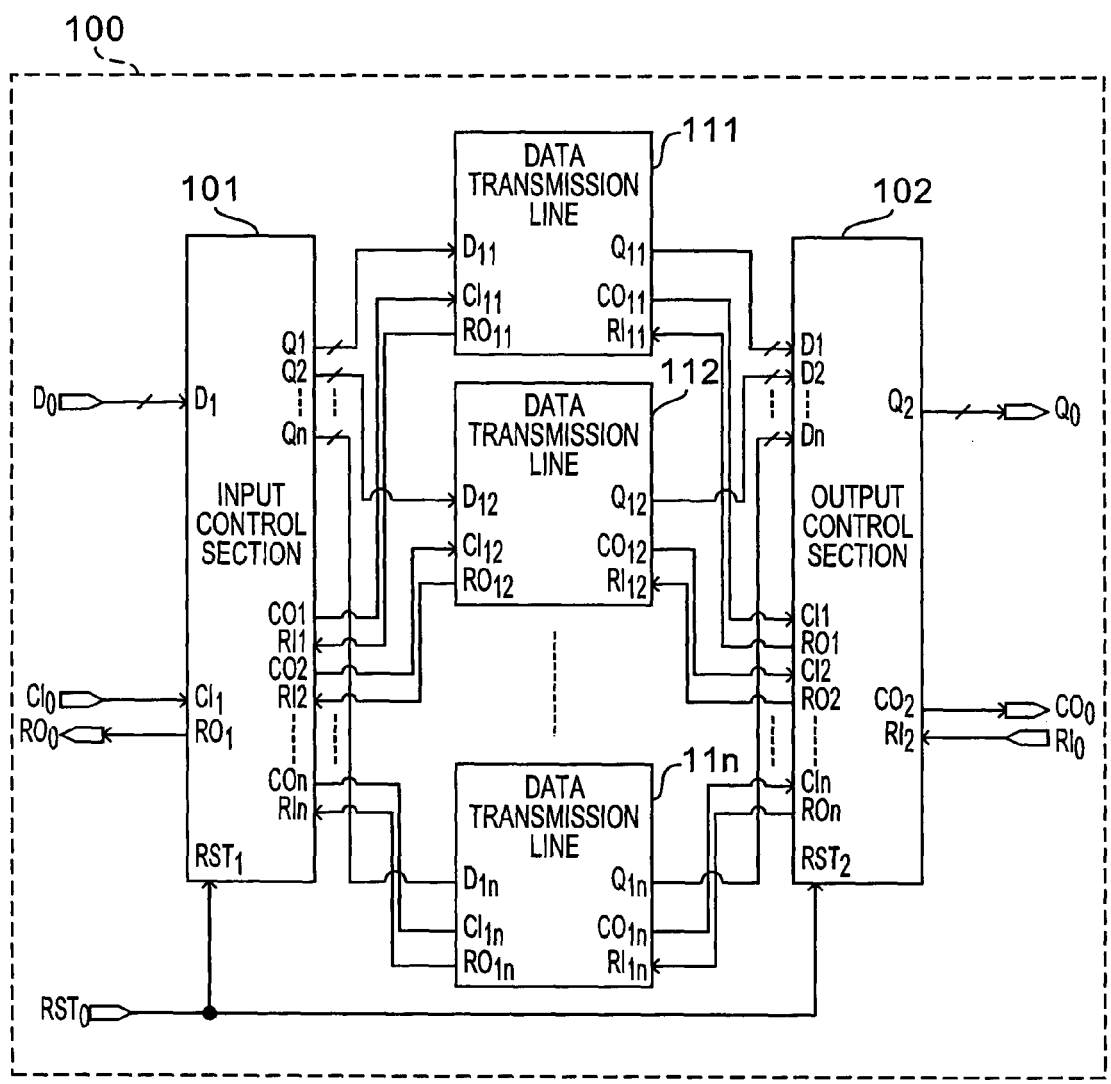
FIG. 1 is a block diagram showing the configuration of a first embodiment of the self-synchronous FIFO memory device according to the present invention.

FIG. 1 shows block configuration of a self-synchronous FIFO memory device as a first embodiment of the present invention.

Figure 8:
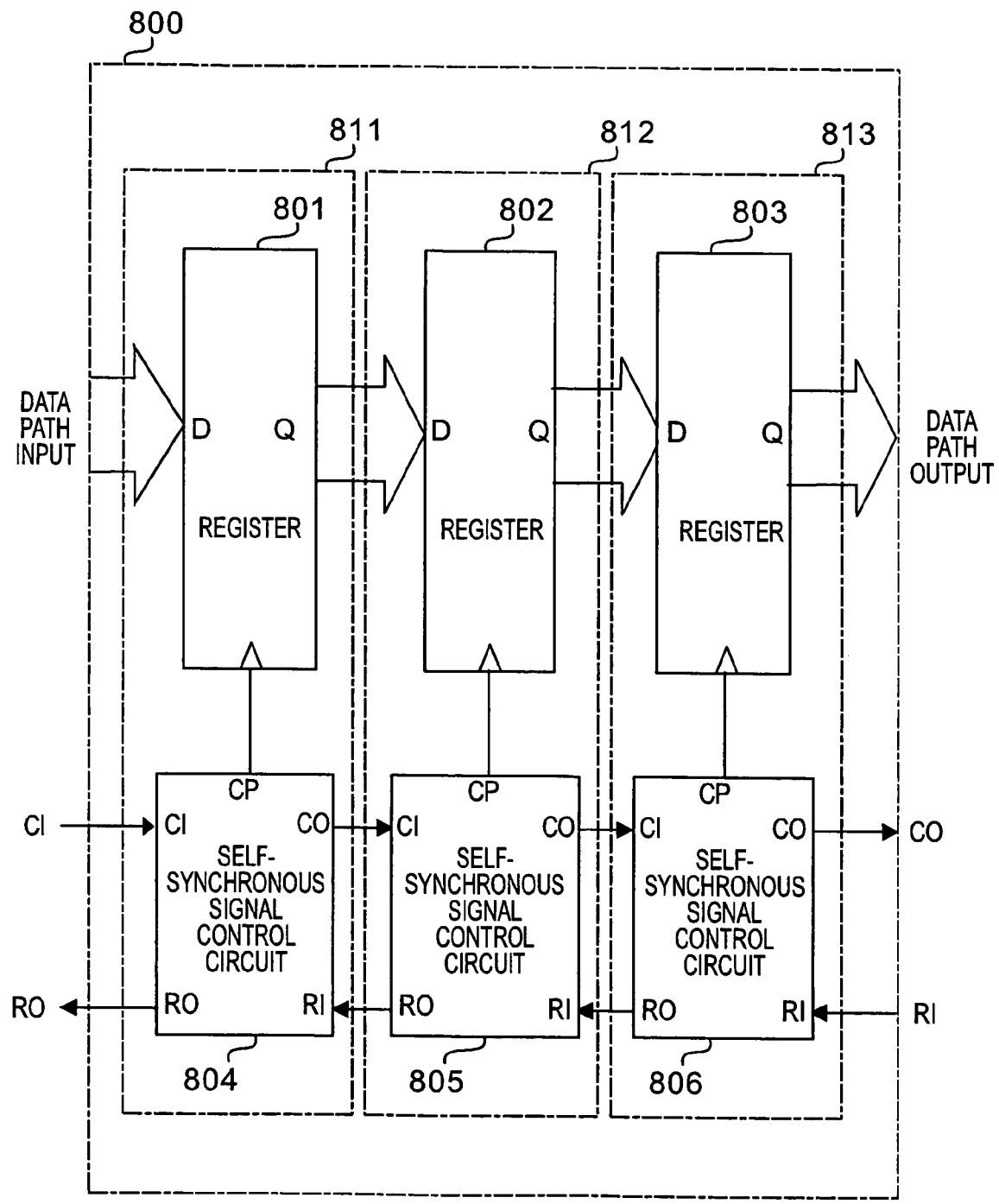
FIG. 8 is a view showing the configuration of a related-art FIFO memory device in which self-synchronous data transmission lines are connected in cascade.
Figure 9:
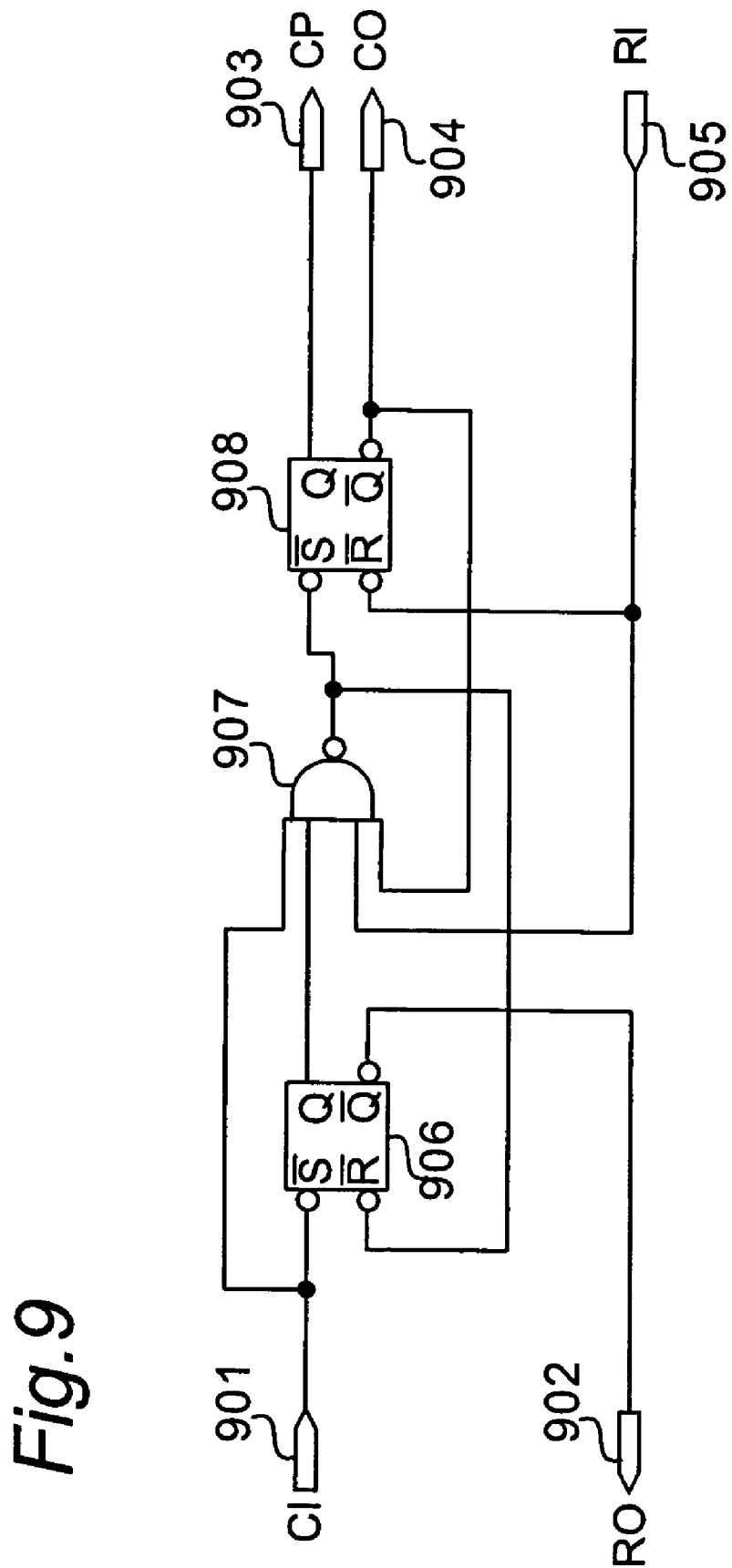
FIG. 9 is a circuit diagram showing an example of the self-synchronous signal control circuit which is applied to the related-art FIFO memory device and to an embodiment of the present invention.
Figure 10:
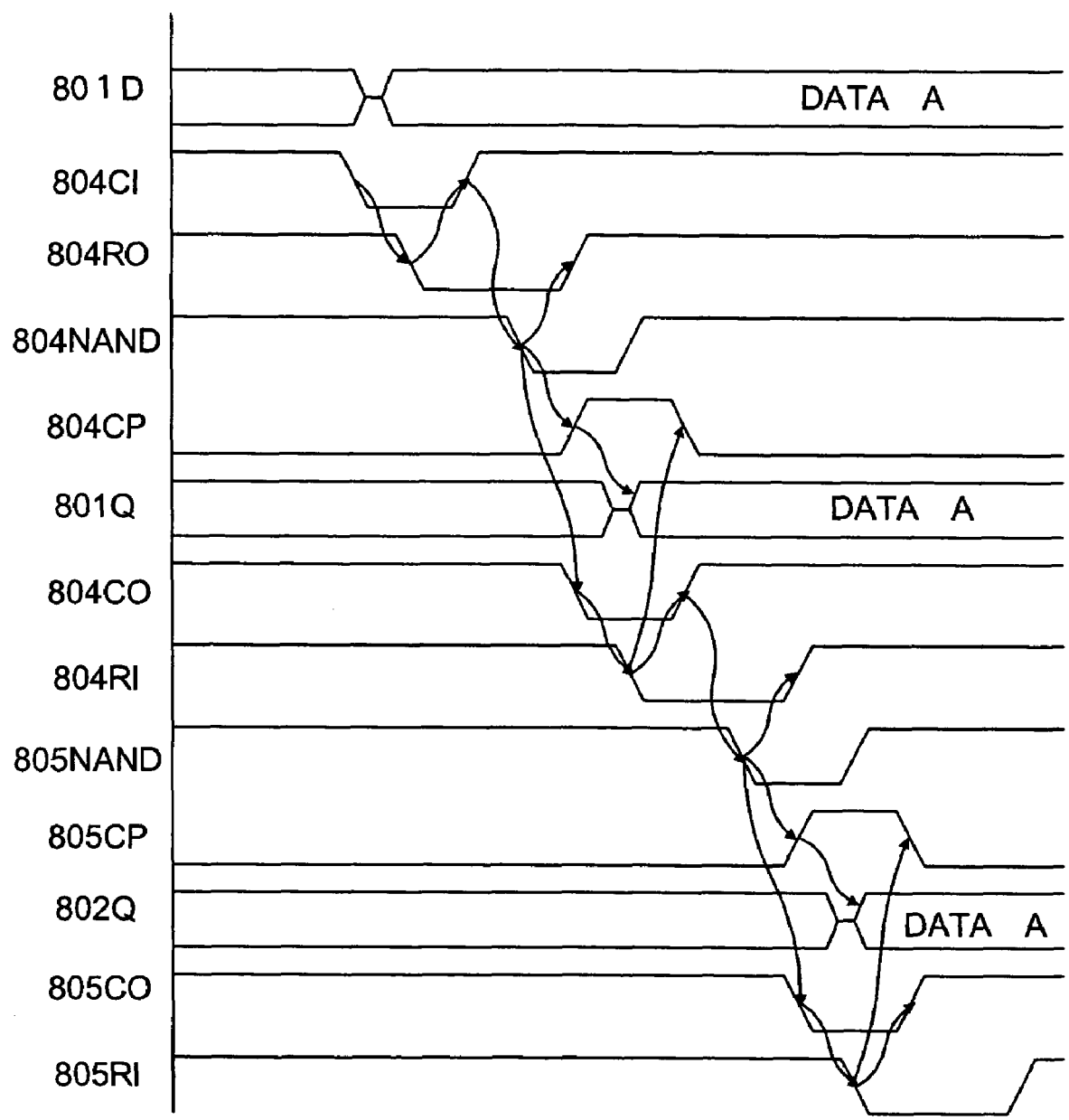
FIG. 10 is a view showing an example of the timing chart of the self-synchronous pipeline in the related-art FIFO memory device.

The self-synchronous FIFO memory device 100 of this first embodiment has input terminals $RST_0$, $CI_0$, $RI_0$ and $D_0$ as well as output terminals $CO_0$, $RO_0$, $Q_0$. This FIFO memory device 100 also includes an input control section 101 and an output control section 102, as well as n self-synchronous data transmission lines 111-11n connected in parallel between the input control section 101 and the output control section 102. Each of these self-synchronous data transmission lines 111-11n is composed of a self-synchronous signal control circuit and a data hold circuit. This self-synchronous signal control circuit is similar in construction to the self-synchronous signal control circuit 804 of FIG. 8, and the data hold circuit is similar in construction to the pipeline register 801 of FIG. 8.

Figure 7:
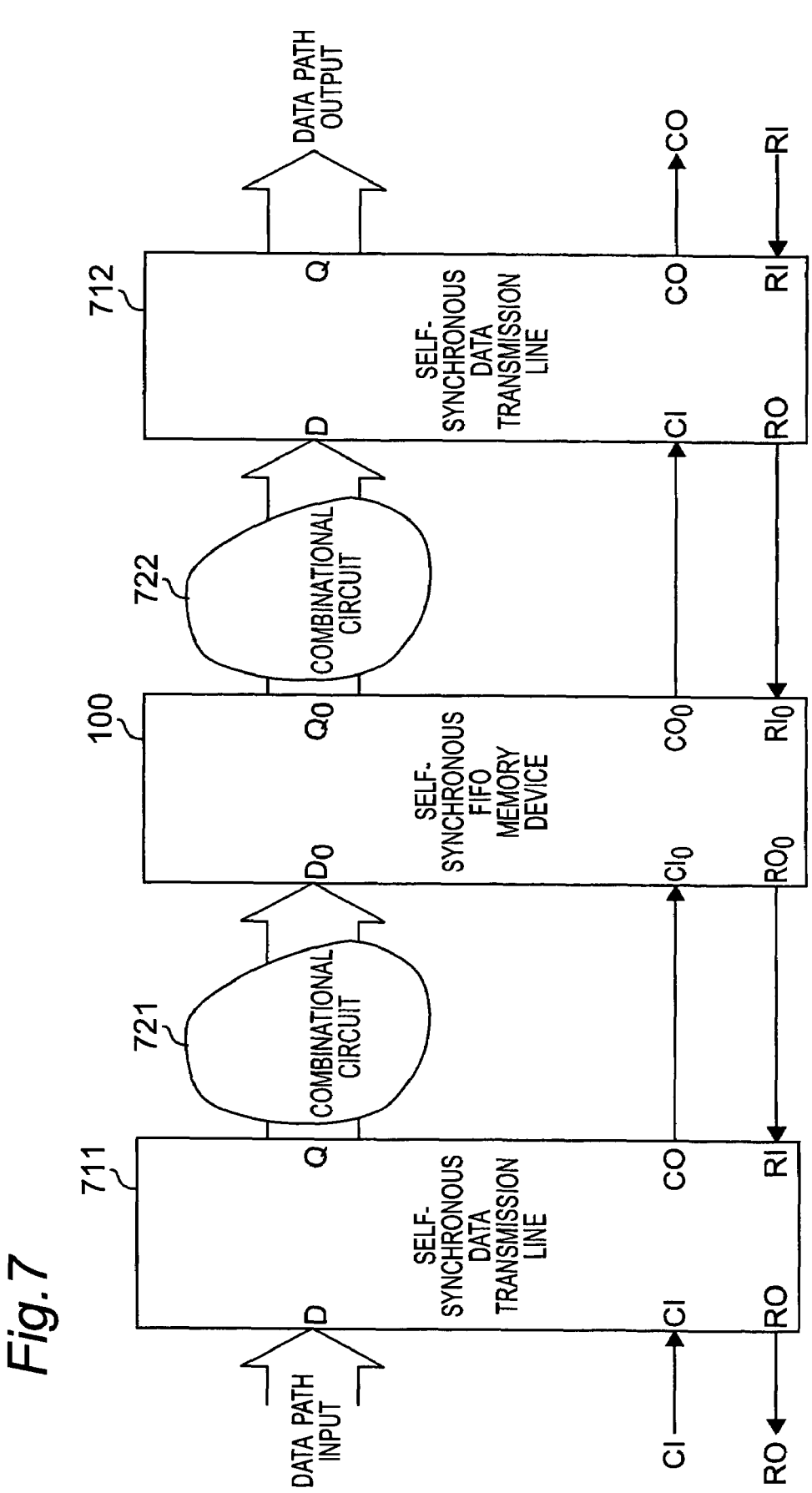
FIG. 7 is a view showing an example of a self-synchronous pipeline system into which the self-synchronous FIFO memory device 100 of the first embodiment is inserted.

As shown in FIG. 1, all of these n self-synchronous data transmission lines 111, 112, ... 11n are arranged in parallel between the input control section 101 and the output control section 102. Also, in this FIFO memory device 100, a preceding-stage section is connected to the input side of the input control section 101, while a succeeding-stage section is connected to the output side of the output control section 102. These preceding-stage section and succeeding-stage section are given by, for example, self-synchronous data transmission lines 711 and 712, respectively, such as shown in FIG. 7. Otherwise, the preceding-stage section and the succeeding-stage section may also be given, for example, by a construction similar to that of this FIFO memory device 100.

The input control section 101 has an input terminal $CI_1$ to which a first transfer request signal inputted from the preceding-stage section is inputted, as well as an output terminal $RO_1$ for outputting to the preceding-stage section a first acknowledge signal derived from the self-synchronous data transmission lines 111-11n, and a data input terminal $D_1$ to which data from the preceding-stage section is inputted. These input terminal $CI_1$, output terminal $RO_1$ and data input terminal $D_1$ are connected to the input terminal $CI_0$, output terminal $RO_0$ and data input terminal $D_0$, respectively, of the FIFO memory device 100.

Further, the input control section 101 has n output terminals CO1-COn for outputting a transfer request signal, n input terminals RI1-RIn to each of which an acknowledge signal is inputted, and n data output terminals Q1-Qn for outputting data. These n output terminals CO1-COn of the input control section 101 are connected to input terminals $CI_{11}$-$CI_{1n}$, respectively, of the n self-synchronous data transmission lines 111-11n. Also, the n input terminals RI1-RIn of the input control section 101 are connected to n output terminals $RO_{11}$-$RO_{1n}$, respectively, of the n self-synchronous data transmission lines 111-11n. Also, the n data output terminals Q1-Qn of the input control section 101 are connected to data input terminals $D_{11}$-$D_{1n}$, respectively, of the n self-synchronous data transmission lines 111-11n.

Further, the input control section 101 has an input terminal $RST_1$ to which an initialization signal is inputted, and the input terminal $RST_1$ is connected to the input terminal $RST_0$ of the FIFO memory device 100.

(Operation of Input Control Section 101)

When an initialization signal is inputted to the input terminal $RST_0$, causing the input terminal $RST_1$ of the input control section 101 to come to H level, the input control section 101 makes the input terminal $CI_1$ and the output terminal CO1 connect to each other, the output terminal $RO_1$ and the input terminal RI1 connect to each other, and the data input terminal $D_1$ and the data output terminal Q1 connect to each other, thus being initialized.

Then, after the initialization on, during the input terminal $RST_1$ keeps L level, the input control section 101 switches the internal connection between the input terminal $CI_1$ and the output terminals CO1-COn each time the input terminal $CI_1$ changes from L level to H level. That is, upon each level change, the input control section 101 sequentially selects the output terminals CO2, ..., COn, CO1, CO2, ... cyclically and connects them to the input terminal $CI_1$.

Likewise, after the initialization on, during the input terminal $RST_1$ keeps L level, the input control section 101 switches the internal connection between the output terminal $RO_1$ and the input terminals RI1-RIn each time the input terminal $CI_1$ changes from L level to H level. That is, upon each level change, the input control section 101 sequentially selects the input terminals RI2, . . . , RIn, RI1, RI2, . . . cyclically and connects them to the output terminal $RO_1$.

Likewise, after the initialization on, during the input terminal $RST_1$ keeps L level, the input control section 101 switches the internal connection between the data input terminal $D_1$ and data output terminals Q1-Qn each time the input terminal $CI_1$ changes from L level to H level. That is, upon each level change, the input control section 101 sequentially selects the data output terminals Q2, . . . , Qn, Q1, Q2, . . . cyclically and connects them to the data input terminal $D_1$.

(Operation of Output Control Section 102)

The output control section 102 has n input terminals CI1-CIn to which second transfer request signals from the n self-synchronous data transmission lines 111-11$n$ are inputted, respectively, and n output terminals RO1-ROn for outputting a second acknowledge signal derived from the succeeding-stage section. Also, the output control section 102 has n data input terminals D1-Dn to which data derived from the n self-synchronous data transmission lines 111-11$n$ are inputted, respectively.

These n data input terminals D1-Dn are connected to data output terminals $Q_{11}$-$Q_{1n}$ of the n self-synchronous data transmission lines 111-11$n$, respectively. Also, the n output terminals RO1-ROn are connected to input terminals $RI_{11}$-$RI_{1n}$, respectively, of the n self-synchronous data transmission lines 111-11$n$. Further, the n input terminals CI1-CIn are connected to output terminals $CO_{11}$-$CO_{1n}$, respectively, of the n self-synchronous data transmission lines 111-11$n$.

Further, the output control section 102 has an output terminal $CO_2$ for outputting a second transfer request signal to the succeeding-stage section, an input terminal $RI_2$ to which a second acknowledge signal inputted from the succeeding-stage section is inputted, and a data output terminal $Q_2$. These output terminal $CO_2$, input terminal $RI_2$ and data output terminal $Q_2$ are connected to the output terminal $CO_0$, input terminal $RI_0$ and data output terminal $Q_0$, respectively, of the FIFO memory device 100. Also, the output control section 102 has an input terminal $RST_2$ to which an initialization signal is inputted, and this input terminal $RST_2$ is connected to the input terminal $RST_0$ of the FIFO memory device 100.

In this output control section 102, when an initialization signal is inputted from the input terminal $RST_0$, causing the input terminal $RST_2$ to come to H level, the output control section 102 is initialized. That is, the output control section 102 makes the input terminal CI1 connect to the output terminal $CO_2$, the input terminal $RI_2$ connect to the output terminal RO1, and the data input terminal D1 connect to the data output terminal $Q_2$.

After this initialization on, during the reset input terminal $RST_2$ keeps L level, the output control section 102 switches the internal connection between the output terminal $CO_2$ and the n input terminals CI1-CIn each time the input terminal $RI_2$ changes from L level to H level. That is, upon each level change, the output control section 102 sequentially selects the input terminals CI2, . . . , CIn, CI1, CI2, . . . cyclically and connects them to the output terminal $CO_2$.

Likewise, during the reset input terminal $RST_2$ keeps L level, the output control section 102 switches the internal connection between the input terminal $RI_2$ and the n output terminals RO1-ROn each time the input terminal $RI_2$ changes from L level to H level. That is, upon each level change, the output control section 102 sequentially selects the output terminals RO2, . . . , ROn, RO1, RO2, . . . cyclically and connects them to the input terminal $RI_2$. Likewise, upon each level change, the output control section 102 sequentially selects the data input terminal D2, . . . , Dn, D1, D2, . . . cyclically and connects them to the data output terminal $Q_2$.

(Internal Structure of Input Control Section 101)

Next, internal structure of the input control section 101 is described with reference to the block diagram of FIG. 2. This input control section 101 has a self-synchronous data transmission line 201, a sequencer 202, a distribution control circuit 203 and a data distribution circuit 204.

As described above, this input control section 101 has an input terminal $RST_1$ for the initialization signal, a data input terminal $D_1$ for data derived from the preceding-stage section, an input terminal $CI_1$ for the first transfer request signal derived from the preceding-stage section, and input terminals RI1-RIn for the first acknowledge signals derived from the n self-synchronous data transmission lines 111-11$n$. Further, the input control section 101 has data output terminals Q1-Qn for the self-synchronous data transmission lines 111-11$n$, output terminals CO1-COn for the first transfer request signals directed toward the self-synchronous data transmission lines 111-11$n$, and an output terminal $RO_1$ for the first acknowledge signal directed toward the preceding-stage section.

The sequencer 202 has an input terminal $RST_{22}$ for a reset signal, an input terminal $CLK_{22}$ for a clock signal, and an output terminal $SEQ_{22}$ for a distribution instruction signal. The input terminal $CLK_{22}$ is connected to an output terminal $CO_{21}$ of the self-synchronous data transmission line 201. Also, the input terminal $RST_{22}$ of the sequencer 202 is connected to the input terminal $RST_1$ of the input control section 101.

When the input terminal $RST_{22}$ has come to H level, this sequencer 202 is initialized so that the value of the output terminal $SEQ_{22}$ is set to "1." After this initialization on, during the input terminal $RST_{22}$ keeps L level, the sequencer 202 changes the value of the output terminal $SEQ_{22}$ in an order of "2," . . . , "n," "1," "2," . . . cyclically each time the clock-signal input terminal $CLK_{22}$ changes from L level to H level.

Also, the distribution control circuit 203 has an input terminal $CI_{23}$ to which the first transfer request signal is inputted, output terminals $CO1_3$-$COn_3$ for outputting the first transfer request signal, input terminals $RI1_3$-$RIn_3$ to which the first acknowledge signal (transfer instruction signal) is inputted, an output terminal $RO_{23}$ for outputting the first acknowledge signal (transfer instruction signal), and an input terminal $SEL_{23}$ to which the distribution instruction signal is inputted. The input terminal $CI_{23}$ is connected to the output terminal $CO_{21}$ of the self-synchronous data transmission line 201, and the output terminal $RO_{23}$ is connected to an input terminal $RI_{21}$ of the self-synchronous data transmission line 201.

It is noted that in the case where the self-synchronous data transmission line 201 is not provided, the input terminal $CI_{23}$ and output terminal $RO_{23}$ of the distribution control circuit 203 may be connected directly to the input terminal $CI_1$ and output terminal $RO_1$, respectively, of the input control section 101. Likewise, in the case where the self-synchronous data transmission line 201 is not provided, the input terminal $CLK_{22}$ of the sequencer 202 may be connected directly to the input terminal $CI_1$ of the input control section 101. Also, the input terminal $SEL_{23}$ of this distribution control circuit 203 is connected to the output terminal $SEQ_{22}$ of the sequencer 202.

Further, the n output terminals $CO1_3$-$COn_3$ of this distribution control circuit 203 are connected to the n output terminals CO1-COn, respectively, of the input control section 101. Also, the n input terminals $RI1_3$-$RIn_3$ of this distribution control circuit 203 are connected to the n input terminals RI1-RIn, respectively, of the input control section 101.

This distribution control circuit 203 transfers a signal inputted to the input terminal $CI_{23}$ to one of the n output terminals $CO1_3$-$COn_3$ according to a signal value of the distribution instruction signal inputted from the output terminal $SEQ_{22}$ of the sequencer 202 to the input terminal $SEL_{23}$. Also likewise, this distribution control circuit 203 transfers a signal of one of the n input terminals $RI1_3$-$RIn_3$ to the output terminal $RO_{23}$ according to the value of the input terminal $SEL_{23}$.

Also, the data distribution circuit 204 has a data input terminal $D_{24}$, data output terminals $Q1_4$-$Qn_4$, and an input terminal $SEL_{24}$ for the distribution instruction signal. This data input terminal $D_{24}$ is connected to a data output terminal $Q_{21}$ of the self-synchronous data transmission line 201.

It is noted that in the case where the self-synchronous data transmission line 201 is not provided, the data input terminal $D_{24}$ of the data distribution circuit 204 may be connected directly to the data input terminal $D_1$ of the input control section 101. Also, the input terminal $SEL_{24}$ of this data distribution circuit 204 is connected to the terminal $SEQ_{22}$ of the sequencer 202.

Also, the n data output terminals $Q1_4$-$Qn_4$ of this data distribution circuit 204 are connected to the n data output terminals Q1-Qn, respectively, of the input control section 101. This data distribution circuit 204 transfers a signal value inputted to the data input terminal $D_{24}$ to one of the n data output terminals $Q1_4$-$Qn_4$ according to a signal value of the distribution instruction signal inputted from the terminal $SEQ_{22}$ of the sequencer 202 to the input terminal $SEL_{24}$. For example, the data distribution circuit 204 transfers a signal value inputted to the data input terminal $D_{24}$ to the data output terminals $Q1_4$, $Q2_4$-$Qn_4$ in correspondence to the values "1," "2," ... "n" of the distribution instruction signal.

In order that the values (voltages) of the n output terminals CO1-COn in this input control section 101 will not become unstable, it has to be ensured that a change in the value (voltage) of the input terminal $SEL_{23}$ of the distribution control circuit 203 is effected during the input terminal $CI_{23}$ of the distribution control circuit 203 keeps H level. This is ensured, in this input control section 101, by feeding identical input signals from the output terminal $CO_{21}$ of the self-synchronous data transmission line 201 to the input terminal $CLK_{22}$ of the sequencer 202 and the input terminal $CI_{23}$ of the distribution control circuit 203.

That is, a certain time period is required after the input terminal $CLK_{22}$ of the sequencer 202 has changed to H level until the value of the input terminal $SEL_{23}$ of the distribution control circuit 203 changes. Therefore, it is ensured that the output terminal $CO_{21}$ of the self-synchronous data transmission line 201 has already been stabilized at H level at the time when the value of the input terminal $SEL_{23}$ of the distribution control circuit 203 changes.

Also, the structure of a self-synchronous signal control circuit (not shown) provided inside the self-synchronous data transmission line 201 ensures a sufficient shortness of the time required after the clock-signal input terminal $CLK_{22}$ of the sequencer 202 has changed to H level until the value of the input terminal $SEL_{23}$ of the distribution control circuit 203 changes, as compared with the time required after the input terminal $CI_{23}$ of the distribution control circuit 203 has changed to H level until its changing again to L level.

As far as the relationship between the value (voltage) of the input terminal $SEL_{23}$ and the value (voltage) of the input terminal $CI_{23}$ in the distribution control circuit 203 is ensured, a transfer control signal outputted by an output terminal $RO_{21}$ of the self-synchronous data transmission line 201 (or a self-synchronous signal control circuit provided inside the self-synchronous data transmission line 201) may also be used as an input for the input terminal $CLK_{22}$ of the sequencer 202.

It is noted that the self-synchronous data transmission line 201 in this input control section 101 is not essential for the function of the input control section in the present invention. However, without the provision of the self-synchronous data transmission line 201, it would take time to distribute input data for the data input terminal $D_1$ of the input control section 101 to the data output terminals Q1-Qn. Therefore, providing the self-synchronous data transmission line 201 has an advantage of enabling more reliable data transmission without decreasing the data transfer rate.

(Internal Structure of Output Control Section 102)

Next, internal structure of the output control section 102 in FIG. 1 is described with reference to the block diagram of FIG. 3. This output control section 102 has a self-synchronous data transmission line 301, a sequencer 302, a selection control circuit 303 and a data selection circuit 304.

Also, this output control section 102 has an input terminal $RST_2$, n input terminals D1-Dn, n input terminals CI1-CIn, and an input terminal $RI_2$. Further, this output control section 102 has an output terminal $Q_2$, an output terminal $CO_2$ and n output terminals RO1-ROn.

The sequencer 302 has a reset-signal input terminal $RST_{32}$, a clock-signal input terminal $CLK_{32}$ and a selection-instruction-signal output terminal $SEQ_{32}$. This clock-signal input terminal $CLK_{32}$ is connected to an output terminal $RO_{31}$ of the self-synchronous data transmission line 301. Also, the input terminal $RST_{32}$ is connected to the input terminal $RST_2$ of the output control section 102.

When the input terminal $RST_{32}$ has come to H level, this sequencer 302 is initialized so that the value of the output terminal $SEQ_{32}$ is set to "1." After the initialization on, during the input terminal $RST_{32}$ keeps L level, the sequencer 302 changes the value of the output terminal $SEQ_{32}$ in an order of "2," "n," "1," "2," ... cyclically each time the clock-signal input terminal $CLK_{32}$ changes from L level to H level.

Also, the selection control circuit 303 has n input terminals $CI1_3$-$CIn_3$ to which the second transfer request signal is inputted, an output terminal $CO_{33}$ for outputting the transfer request signal, an input terminal $RI_{33}$ to which the second acknowledge signal (transfer instruction signal) derived from the succeeding-stage section is inputted, n output terminals $RO1_3$-$ROn_3$ for outputting the second acknowledge signal (transfer instruction signal), and an input terminal $SEL_{33}$ to which the selection instruction signal derived from the sequencer 302 is inputted. Also, the output terminal $CO_{33}$ of this selection control circuit 303 is connected to an input terminal $CI_{31}$ of the self-synchronous data transmission line 301, and the input terminal $RI_{33}$ is connected to the output terminal $RO_{31}$ of the data transmission line 301.

It is noted that in the case where the self-synchronous data transmission line 301 is not provided, the output terminal $CO_{33}$ and input terminal $RI_{33}$ of the selection control circuit 303 may be connected directly to the output terminal $CO_2$ and input terminal $RI_2$, respectively, of the output control section 102. Likewise, in the case where the self-synchronous data transmission line 301 is not provided, the input terminal $CLK_{32}$ of the sequencer 302 may be connected directly to the input terminal $RI_2$ of the output control section 102.

Also, the input terminal $SEL_{33}$ of the selection control circuit 303 is connected to the output terminal $SEQ_{32}$ of the sequencer 302. The n input terminals $CI1_3$-$CIn_3$ of the selection control circuit 303 are connected to the n input terminals CI1-CIn of the output control section 102. The n output terminals $RO1_3$-$ROn_3$ of this selection control circuit 303 are connected to the n output terminals RO1-ROn, respectively, of the output control section 102.

This selection control circuit 303 selects a signal of one terminal out of the input terminals $CI1_3$-$CIn_3$ according to the value of the input terminal $SEL_{33}$ to which the selection instruction signal derived from the sequencer 302 is inputted, and then transfers the signal to the output terminal $CO_{33}$. Also likewise, the selection control circuit 303 selects one terminal out of the output terminals $RO1_3$-$ROn_3$ according to the value of the input terminal $SEL_{33}$, and then transfers to this selected terminal the second acknowledge signal derived from the input terminal $RI_{33}$.

Also, the data selection circuit 304 has n input terminals $D1_4$-$Dn_4$ to which data is inputted, an output terminal $Q_{34}$ for outputting data, and an input terminal $SEL_{34}$ to which the selection instruction signal derived from the sequencer 302 is inputted. This output terminal $Q_{34}$ is connected to a data input terminal $D_{31}$ of the self-synchronous data transmission line 301.

It is noted that in the case where the self-synchronous data transmission line 301 is not provided, the output terminal $Q_{34}$ of the data selection circuit 304 may be connected directly to the data output terminal $Q_2$ of the output control section 102.

Also, the input terminal $SEL_{34}$ of this data selection circuit 304 is connected to the output terminal $SEQ_{32}$ of the sequencer 302. Also, the n data input terminals $D1_4$-$Dn_4$ of the data selection circuit 304 are connected to the n data input terminals D1-Dn, respectively, of the output control section 102.

Also, the data selection circuit 304 selects a value of one terminal out of the input terminals $D1_4$-$Dn_4$ according to the value of the input terminal $SEL_{34}$ to which the selection instruction signal derived from the sequencer 302 is inputted, and then transfers the value to the output terminal $Q_{34}$.

In order that the values of the output terminals RO1-ROn of the output control section 102 will not become unstable, it has to be ensured that a change in the value of the input terminal $SEL_{33}$ of the selection control circuit 303 is effected during the input terminal $RI_{33}$ of the selection control circuit 303 keeps H level. This is ensured, in the output control section 102 of FIG. 3, by feeding identical input signals (second acknowledge signals) from the output terminal $RO_{31}$ of the self-synchronous data transmission line 301 to the input terminal $CLK_{32}$ of the sequencer 302 and the input terminal $RI_{33}$ of the selection control circuit 303.

That is, in this output control section 102, a certain time period is required after the input terminal $CLK_{32}$ of the sequencer 302 has changed to H level until the value of the input terminal $SEL_{33}$ of the selection control circuit 303 changes. Therefore, it is ensured that the input terminal $RI_{33}$ of the selection control circuit 303 has already been stabilized at H level at the time when the value of the input terminal $SEL_{33}$ of the selection control circuit 303 changes.

Also, the structure of the self-synchronous signal control circuit included in the self-synchronous data transmission line 301 ensures a sufficient shortness of the time required after the input terminal $CLK_{32}$ of the sequencer 302 has changed to H level until the value of the input terminal $SEL_{33}$ of the selection control circuit 303 changes, as compared with the time required after the input terminal $RI_{33}$ of the selection control circuit 303 has changed to H level until its changing again to L level. As far as the relationship between the value of the input terminal $SEL_{33}$ and the value of the input terminal $RI_{33}$ in the selection control circuit 303 is ensured, a transfer control signal outputted by a self-synchronous signal control circuit (not shown) provided inside the self-synchronous data transmission line 301 may also be used as an input for the input terminal $CLK_{32}$ of the sequencer 302.

It is noted that the self-synchronous data transmission line 301 provided in this output control section 102 is not essential for the function of the output control section in this embodiment. However, without the provision of the self-synchronous data transmission line 301, it would take time to select one out of data inputted to the data input terminals D1-Dn, and then transfer the data to the data output terminal $Q_2$. In consideration of this, it is desirable to provide this self-synchronous data transmission line 301 with a view to fulfilling more reliable data transmission without decreasing the data transfer rate.

In the FIFO memory device 100 of this first embodiment, the input control section 101 selects one out of the parallel-connected self-synchronous data transmission lines 111-11n, and transfers to this one selected self-synchronous data transmission line a first transfer request signal inputted from the preceding-stage section. Also, the input control section 101 transfers to the preceding-stage section a first acknowledge signal outputted from the selected self-synchronous data transmission line. Further, based on the first transfer request signal and the first acknowledge signal, the input control section 101 decides whether or not data transfer to the selected self-synchronous data transmission line is enabled. If the data transfer to the selected self-synchronous data transmission line is enabled, then the input control section 101 outputs input data, which is inputted from the preceding-stage section, to the selected self-synchronous data transmission line.

Also, the output control section 102 selects one out of the parallel-connected self-synchronous data transmission lines 111-11n, and outputs a second transfer request signal, which is outputted from the selected self-synchronous data transmission line, to the succeeding-stage section. Also, the output control section 102 outputs a second acknowledge signal, which is inputted from the succeeding-stage section, to the selected self-synchronous data transmission line. Further, based on the second transfer request signal and the second acknowledge signal, the output control section 102 decides whether or not data transfer to the succeeding-stage section is enabled. If the data transfer to the succeeding-stage section is enabled, then the output control section 102 outputs output data, which is outputted from the selected self-synchronous data transmission line, to the succeeding-stage section.

The FIFO memory device of this first embodiment has a structure that n self-synchronous data transmission lines 111-11n are arrayed in parallel, and these n self-synchronous data transmission lines 111-11n are used as element devices for data transfer and data hold.

The input control section 101 selects one out of the parallelly-provided self-synchronous data transmission lines 111-11n, and mediates the reception and delivery of the first transfer request signal, the first acknowledge signal (transfer instruction signal) and data between the selected one self-synchronous data transmission line and the self-synchronous data transmission line contained in the preceding-stage section. Further, the output control section 102 selects one out of the parallelly-provided n self-synchronous data transmission lines 111-11n, and mediates the reception and delivery of the second transfer request signal, the second acknowledge signal (transfer instruction signal) and data between the selected one self-synchronous data transmission line and the self-synchronous data transmission line contained in the succeeding-stage section.

In the self-synchronous FIFO memory device 100 of this first embodiment, since the n self-synchronous data transmission lines 111-11n are arranged in parallel unlike the conventional self-synchronous FIFO memory device in which data transmission lines are connected in series, it becomes implementable to perform data input or output by one-time data transfer for an arbitrary self-synchronous data transmission line. Therefore, in this first embodiment, unlike the conventional FIFO memory device in which self-synchronous data transmission lines are connected in series, it never occurs that the delay time increases in simple proportion to the maximum storage capacity. Accordingly, the physical storage capacity can be substantially increased without increasing the delay time, and moreover, two asynchronous requests of write and read can be processed in parallel.

Also, in the self-synchronous FIFO memory device 100 of this first embodiment, the input control section 101 has the sequencer 202. This sequencer 202 inputs a distribution instruction signal to the distribution control circuit 203, thereby making the distribution control circuit 203 select a transmission path of the first transfer request signal toward one of the parallelly-connected n self-synchronous data transmission lines 111-11n. Also, this sequencer 202 inputs the distribution instruction signal to the distribution control circuit 203, thereby making the distribution control circuit 203 select a transmission path of the first acknowledge signal from the parallelly-connected n self-synchronous data transmission lines 111-11n. Further, the sequencer 202 inputs the distribution instruction signal to the data distribution circuit 204, thereby making the data distribution circuit 204 distribute the input data to one of the n self-synchronous data transmission lines 111-11n.

As shown above, in this first embodiment, which is selected out of the parallelly-provided n self-synchronous data transmission lines 111-11n is determined by the sequencer 202 provided inside the input control section 101. The sequencer 202 is driven by propagation of the transfer request signal inputted from the self-synchronous data transmission line contained in the preceding-stage section, independently of the internal state of the FIFO memory device 100. In this first embodiment, the input control section 101 can be implemented with a simple circuit construction by virtue of the input control section 101 having the sequencer 202.

Further, in the self-synchronous FIFO memory device 100 of this first embodiment, the output control section 102 has the sequencer 302. This sequencer 302 inputs a selection instruction signal to the selection control circuit 303 to control the selection control circuit 303 so that the selection control circuit 303 selects a transmission path of the second transfer request signal out of the n self-synchronous data transmission lines 111-11n. Also, the sequencer 302 inputs a selection instruction signal to the selection control circuit 303, thereby making the selection control circuit 303 select a transmission path of the second acknowledge signal toward the n self-synchronous data transmission lines 111-11n. Further, the sequencer 302 inputs the selection instruction signal to the data selection circuit 304, thereby making the data selection circuit 304 select one out of output data outputted from the n self-synchronous data transmission lines 111-11n.

As shown above, in this first embodiment, which is selected out of the parallelly-provided n self-synchronous data transmission lines 111-11n is determined by the sequencer 302 provided inside the output control section 102. The sequencer 302 is driven by propagation of the acknowledge signal (transfer instruction signal) inputted from the self-synchronous data transmission line contained in the succeeding-stage section, independently of the internal state of the FIFO memory device 100. In this first embodiment, the output control section 102 can be implemented with a simple circuit construction by virtue of the output control section 102 having the sequencer 302.

It is noted that the sequencer 202 inside the input control section 101 and the sequencer 302 inside the output control section 102 operate independently of each other, whereas the order in which the parallelly-provided n self-synchronous data transmission lines 111-11n are selected on and on is desirably set to the same one for both sequencers 202, 302. As a result, it becomes implementable to substantially increase the physical storage capacity with the number of stages dynamically variable and without increasing the delay time.

Second Embodiment

Figure 4:
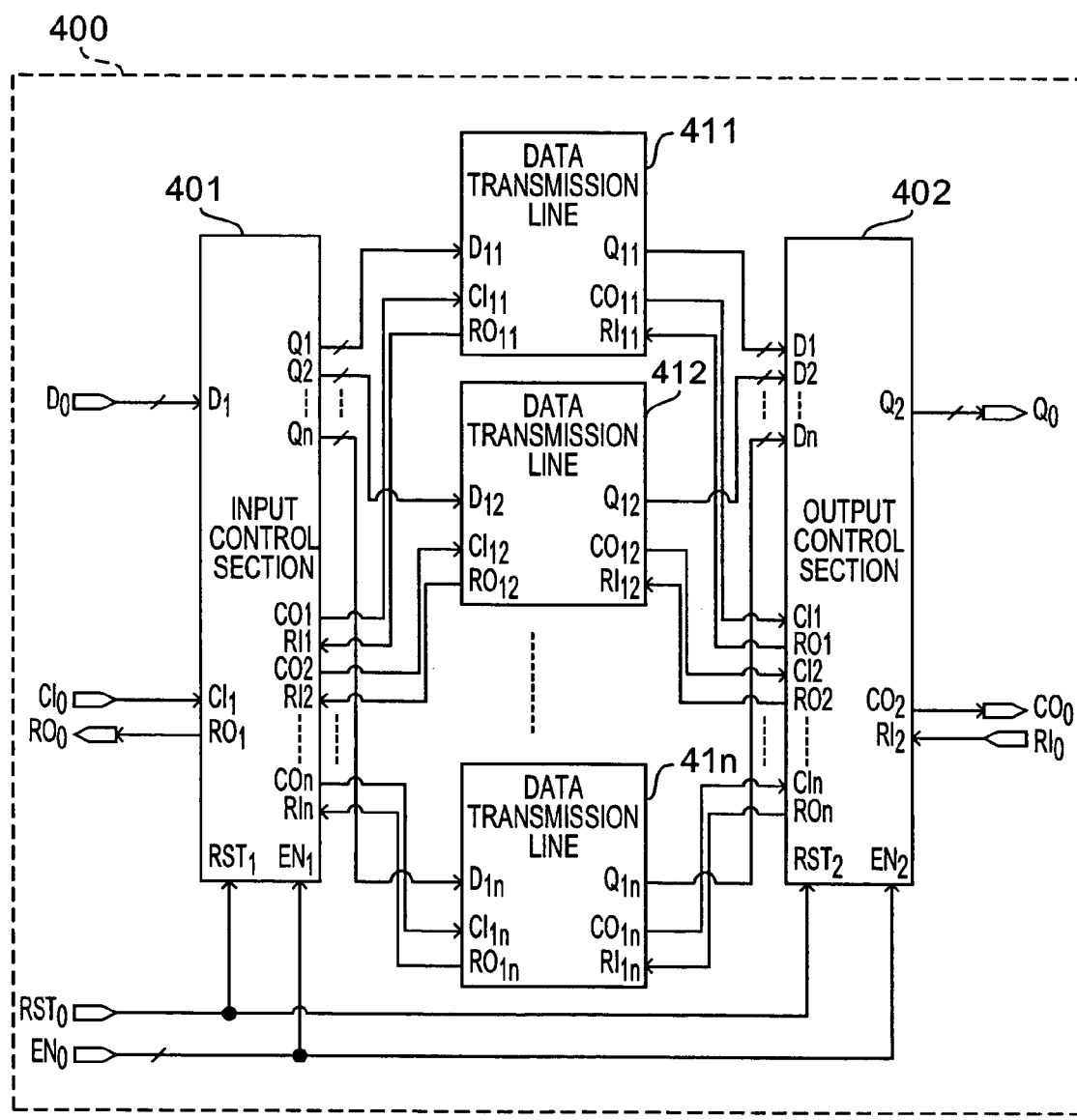
FIG. 4 is a block diagram showing the configuration of a self-synchronous FIFO memory device of a second embodiment for handling of the storage capacity control signal of the invention.

Next, FIG. 4 shows a self-synchronous FIFO memory device 400 as a second embodiment of the present invention. This self-synchronous FIFO memory device 400 includes an input control section 401 and an output control section 402 for handling a data-storage capacity control signal, as well as n self-synchronous data transmission lines 411-41n. These n self-synchronous data transmission lines 411-41n are connected in parallel between the input control section 401 and the output control section 402.

This self-synchronous FIFO memory device 400 has an input terminal $RST_0$, an input terminal $EN_0$, an input terminal $CI_0$, an input terminal R10 and an input terminal $D_0$. Further, this FIFO memory device 400 has an output terminal $CO_0$, an output terminal $RO_0$ and an output terminal $Q_0$.

This second embodiment differs from the connection structure of the self-synchronous FIFO memory device 100 of the first embodiment shown in FIG. 1 only in that the input terminal $EN_0$, to which the storage capacity control signal is inputted, is connected to an input terminal $EN_1$ of the input control section 401 and an input terminal $EN_2$ of the output control section 402.

In this second embodiment, in the case where the input terminal $EN_0$ of the FIFO memory device 400 shows a value of "n", the input control section 401 operates in the same manner as the input control section 101 of the first embodiment, and the output control section 402 operates in the same manner as the output control section 102 of the first embodiment.

Meanwhile, in the case where the input terminal $EN_0$ shows a value of "1," the input control section 401 operates in such a manner as to maintain internal connection only with a self-synchronous data transmission line 411 at all times. Similarly, in the case where the input terminal $EN_0$ shows a value of "1," the output control section 402 operates in such a manner as to maintain internal connection only with the self-synchronous data transmission line 411 at all times. Accordingly, the storage capacity control signal inputted to the input terminal $EN_0$ is a signal directing to select any one of integer values "1" to "n" as the number of data pieces that can be stored between the input control section 401 and the output control section 402.

Figure 5:
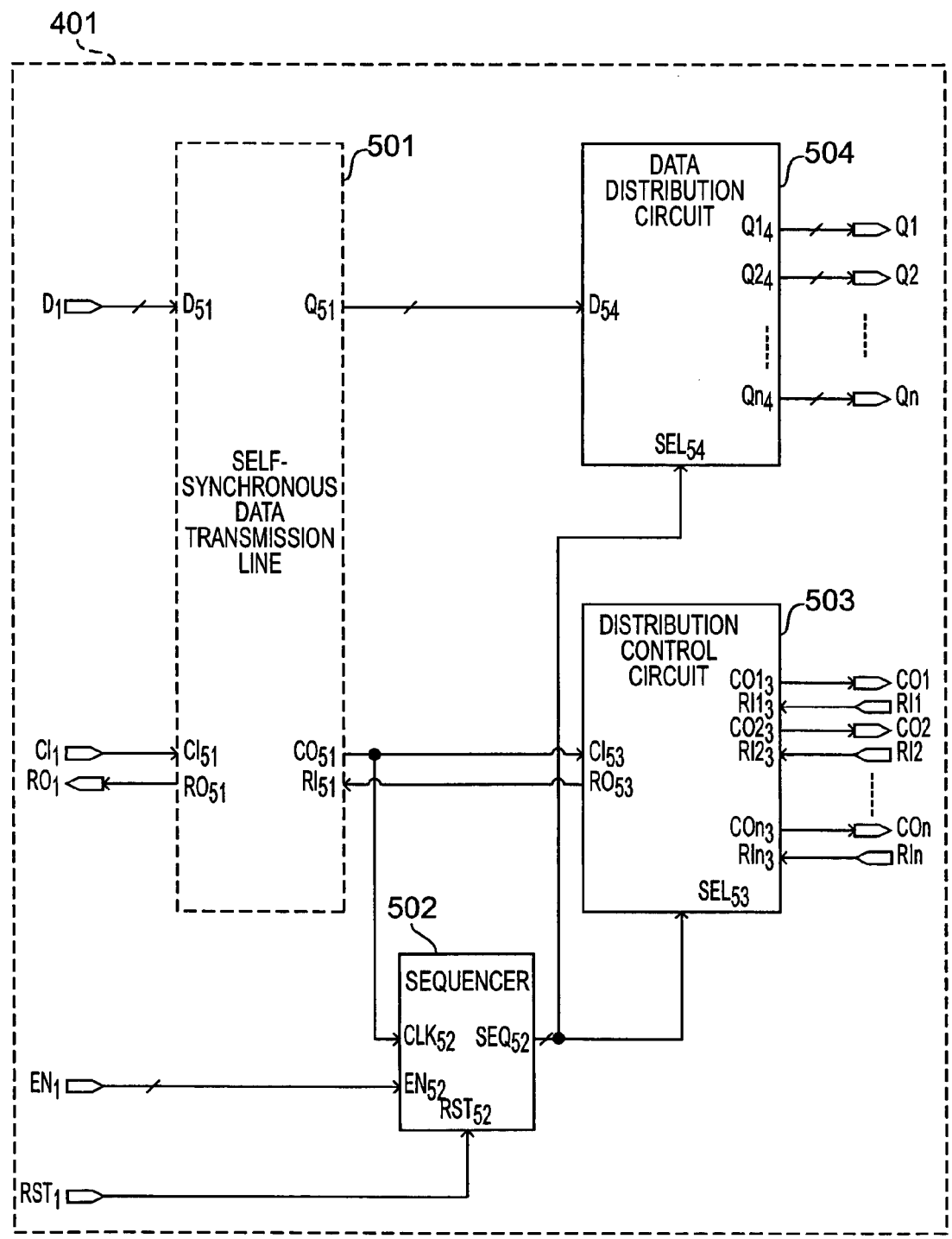
FIG. 5 is a block diagram showing the configuration of an input control section 401 of the second embodiment.

Next, FIG. 5 is a block diagram showing the configuration of the input control section 401 of FIG. 4. This input control section 401 includes a self-synchronous data transmission line 501, a sequencer 502, a distribution control circuit 503 and a data distribution circuit 504.

This input control section 401 has input terminals $RST_1$, $EN_1$, $D_1$, $CI_1$, and n input terminals RI1-RIn. Further, this input control section 401 has n output terminals Q1-Qn, n output terminals CO1-COn, and one output terminal $RO_1$.

Figure 2:
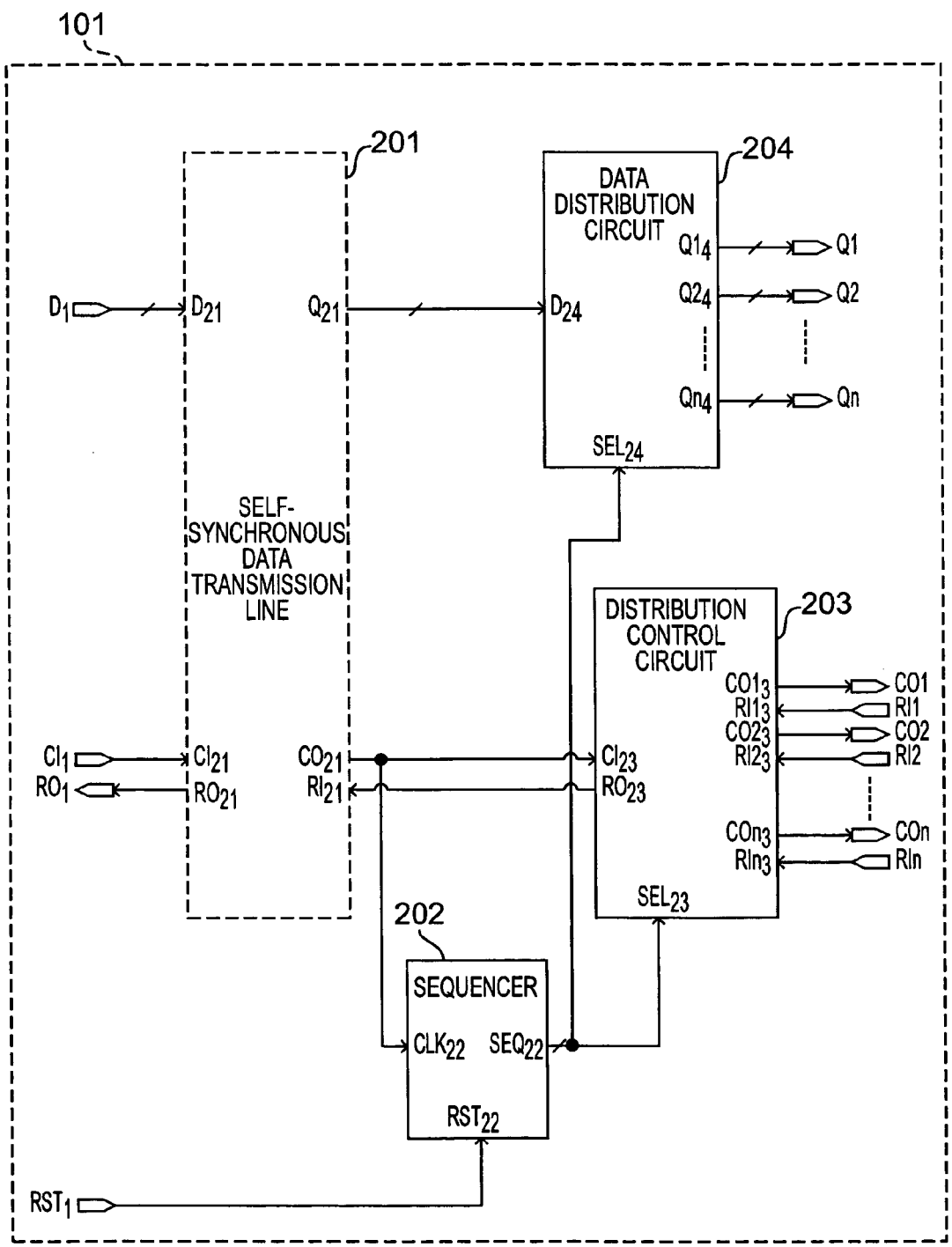
FIG. 2 is a block diagram showing the configuration of an input control section 101 of the first embodiment.

This input control section 401 differs from the connection structure of the input control section 101 shown in FIG. 2 only in that the input terminal $EN_1$, to which the storage capacity control signal is inputted, is connected to an input terminal $EN_{52}$ of the sequencer 502.

In this input control section 401, the sequencer 502 differs from the sequencer 202 of the first embodiment of FIG. 2 only in that if the input terminal $EN_1$ shows a value of i that falls within a range of 1 to n, then the value of an output terminal $SEQ_{52}$ of the sequencer 502 is limited to within a range of 1 to i. That is, if the value i of the input terminal $EN_1$ of the input control section 401 is i=n, then this sequencer 502 operates entirely in the same manner as the sequencer 202 of FIG. 2. Meanwhile, the value i of the input terminal $EN_1$ of the input control section 401 is i=1, then the sequencer 502 outputs a "1" as the value of the output terminal $SEQ_{52}$ at all times. As a result of this, the data distribution circuit 504 and the distribution control circuit 503 select a transmission line in conjunction with the self-synchronous data transmission line 411.

Figure 6:
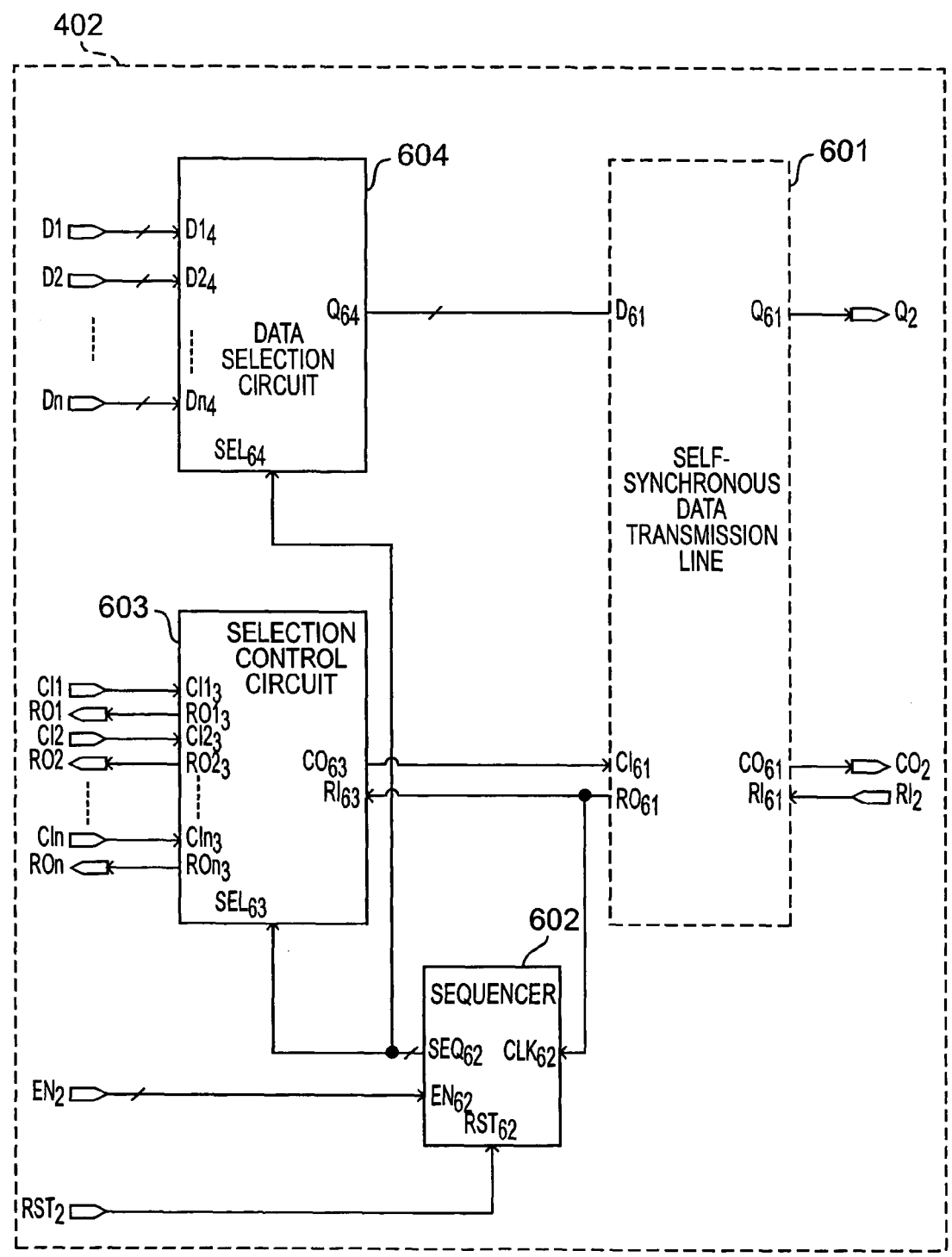
FIG. 6 is a block diagram showing the configuration of an output control section 402 of the second embodiment.

Next, FIG. 6 is a block diagram showing the configuration of an output control section 402 of this second embodiment. This output control section 402 includes a self-synchronous data transmission line 601, a sequencer 602, a selection control circuit 603, and a data selection circuit 604. Also, this output control section 402 includes an input terminals $RST_2$, an input terminal $EN_2$, n input terminals D1-Dn, n input terminals CI1-CIn, and an input terminal $RI_2$.

Further, this output control section 402 includes an output terminal $Q_2$, an output terminal $CO_2$ and n output terminals ROI-ROn. This output control section 402 differs from the connection structure of the output control section 102 of the first embodiment shown in FIG. 3 only in that the input terminal $EN_2$, to which the storage capacity control signal is inputted, is connected to an input terminal $EN_{62}$ of the sequencer 602.

Figure 3:
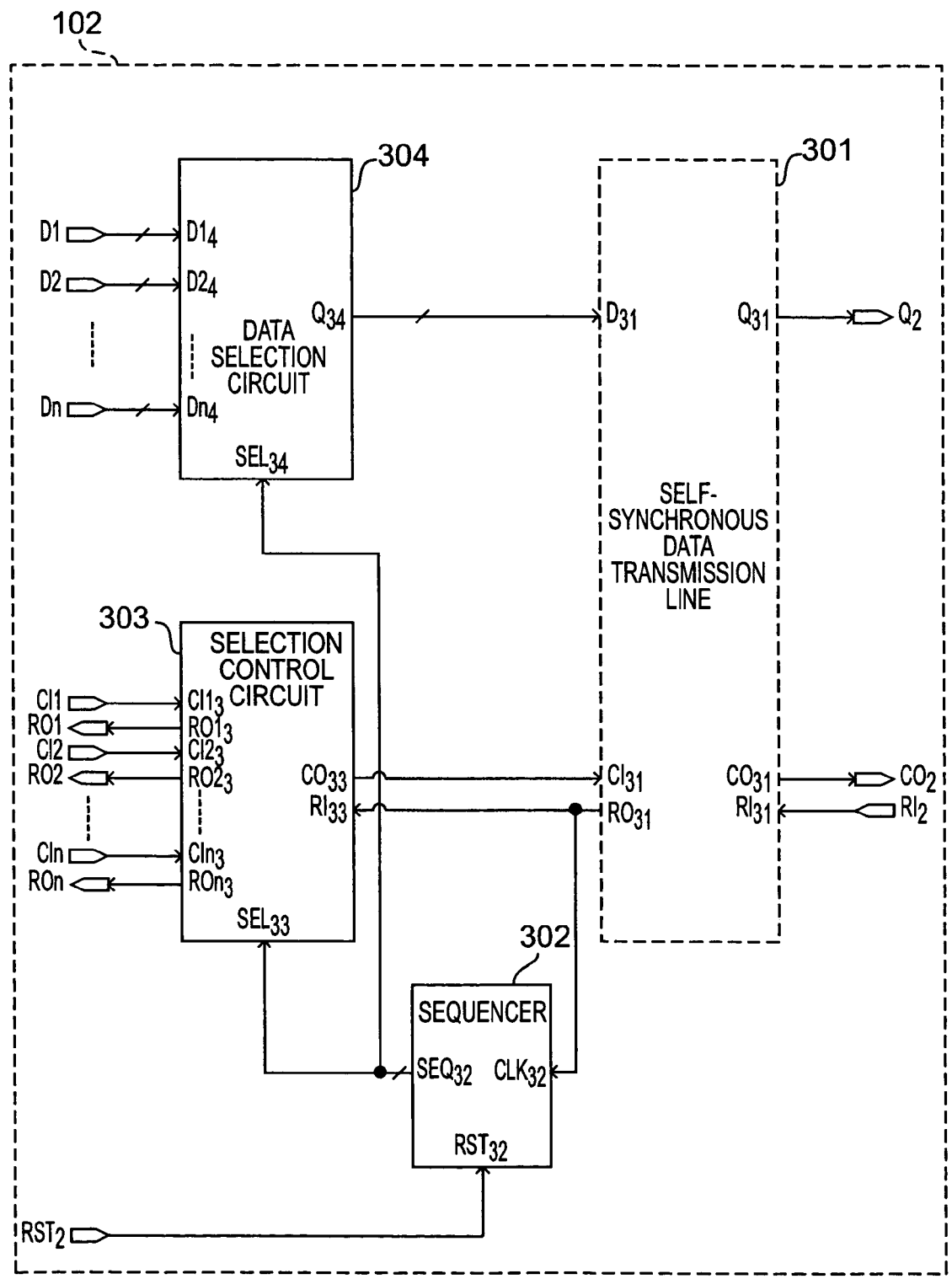
FIG. 3 is a block diagram showing the configuration of an output control section 102 of the first embodiment.

In this output control section 402, the sequencer 602 differs from the sequencer 302 of the first embodiment of FIG. 3 only in that if the input terminal $EN_2$ shows a value of i that falls within a range of 1 to n, then the value of an output terminal $SEQ_{62}$ of the sequencer 602 is limited to within a range of 1 to i. That is, in this output control section 402, if the value i of the input terminal $EN_2$ is i=n, then the sequencer 602 operates entirely in the same manner as the sequencer 302 of FIG. 3. Meanwhile, the value i of the input terminal $EN_2$ is i=1, then the sequencer 602 outputs a "1" as the value of the output terminal $SEQ_{62}$ at all times. As a result of this, the data distribution circuit 604 and the selection control circuit 603 select a transmission line in conjunction with the self-synchronous data transmission line 411.

Thus, according to this second embodiment, by virtue of the inclusion of input terminals $EN_0$, $EN_1$, $EN_2$ for the storage capacity control signal serving for changing the storable data amount, the number of stages of the FIFO memory device 400 can be made statically variable. That is, the dynamically variable number of stages of the FIFO memory device (i.e., maximum storage capacity of the FIFO memory device) can be determined by this storage capacity control signal.

From the standpoint of buffer function, the upper limit of the dynamically variable number of stages is desirably as large as possible. However, it may be still desirable, on the other hand, that the storage capacity of the FIFO memory device is not excessive for cases where the input to the pipeline should favorably be halted under stagnated output of the pipeline. That is, in the self-synchronous pipeline, when the output of the pipeline is stagnated, data transfer is autonomously halted on and on from outlet toward inlet of the pipeline, so that the acknowledge signal is finally fixed to L level at the inlet of the pipeline, thus making it possible for the preceding-stage section to find that the pipeline is saturated. For such a purpose, it is desirable that the maximum storage capacity of the FIFO memory device is properly restricted.

Also, in this second embodiment, the input control section 401 has the sequencer 502, the output control section 402 has the sequencer 602, and these sequencers 502, 602 have the input terminals $EN_{52}$, $EN_{62}$, respectively, for the storage capacity control signal. Then, for the input of the storage capacity control signal to the input control section 401 and the output control section 402, the selection-targeted set out of n self-synchronous data transmission line 411-41n, as well as the order of selection thereamong, are made identical for both the sequencer 502 inside the input control section 401 and the sequencer 602 inside the output control section 402. As a result of this, it becomes implementable to properly restrict the maximum storage capacity of the FIFO memory device according to its application without adding any complex mechanism.

(Application System)

Next, FIG. 7 shows a self-synchronous pipeline system equipped with the self-synchronous FIFO memory device 100 of the first embodiment. In this self-synchronous pipeline system, the self-synchronous FIFO memory device 100 is connected between self-synchronous data transmission lines 711 and 712. In this self-synchronous pipeline system, the self-synchronous data transmission line 711, the self-synchronous FIFO memory device 100 and the self-synchronous data transmission line 712 are connected in cascade.

In this self-synchronous pipeline system, a combinational circuit 721 is connected between the self-synchronous data transmission line 711 and the self-synchronous FIFO memory device 100. Also, a combinational circuit 722 is connected between the self-synchronous FIFO memory device 100 and the self-synchronous data transmission line 712.

The self-synchronous data transmission line 711 includes an input terminal CI for the transfer request signal, an output terminal CO for the first transfer request signal, an input terminal RI for the first acknowledge signal (transfer instruction signal), an output terminal RO for the acknowledge signal (transfer instruction signal), a data input terminal D, and a data output terminal Q. Also, the self-synchronous data transmission line 712 includes an input terminal CI for the second transfer request signal, an output terminal CO for the transfer request signal, an input terminal RI for the acknowledge signal (transfer instruction signal), an output terminal RO for the second acknowledge signal (transfer instruction signal), a data input terminal D, and a data output terminal Q.

In this self-synchronous pipeline system, data is inputted to the data input terminal D of the self-synchronous data transmission line 711. Then, data outputted from the data output terminal Q of the self-synchronous data transmission line 711 is inputted to a data input terminal $D_0$ of the FIFO memory device 100 via the combinational circuit 721.

Then, data outputted from the data output terminal $Q_0$ of the FIFO memory device 100 is inputted to the data input terminal D of the self-synchronous data transmission line 712 via the combinational circuit 722. Further, this self-synchronous data transmission line 712 outputs data from the data output terminal Q.

In this self-synchronous pipeline system as an application system, the self-synchronous data transmission lines 711, 712 and the self-synchronous FIFO memory device 100 have structures that allow alternative use for each other, except for the difference in their internal physical storage capacity.

As an example of more specific application systems of this self-synchronous pipeline system, a self-synchronous arithmetic pipeline is conceivable. In this arithmetic pipeline, the self-synchronous data transmission line 711 is disposed on the input side of the combinational circuit 721, while the self-synchronous data transmission line 712 is disposed on the output side of the combinational circuit 722. As a result of this, the combinational circuits 721 and 722 implement a pipelined arithmetic unit, the combinational circuit 721 implements an arithmetic unit for processing the first half of an operation, and the combinational circuit 722 implements an arithmetic unit for processing the second half of the operation.

In this arithmetic pipeline, in a case where the arithmetic processing time at the combinational circuit 722 can be longer than the processing time at the combinational circuit 721 depending on the contents of arithmetic operation, the self-synchronous data transmission line 712 exercises control so that the timing at which the output terminal RO of the self-synchronous data transmission line 712 rises from L level to H level is temporarily delayed. This makes it possible to ensure enough arithmetic processing time of the combinational circuit 722.

In this case, if the self-synchronous FIFO memory device 100 is not provided, the self-synchronous data transmission line 711 could not hold new data until the processing by the combinational circuit 722 is ended. This would result in lowered throughput of the whole arithmetic pipeline.

In contrast to this, in the case where the self-synchronous FIFO memory device 100 is provided, the combinational circuit 721 can carry on arithmetic operation with the succeeding data train even while the output terminal RO of the self-synchronous data transmission line 712 keeps fixed at L level, as far as the self-synchronous FIFO memory device 100 is not saturated.

Thereafter, when the output terminal RO of the self-synchronous data transmission line 712 has come to H level, the data train stored within the self-synchronous FIFO memory device 100 can be fed to the combinational circuit 722 at the shortest possible intervals.

As shown above, the self-synchronous FIFO memory device 100 of the first embodiment can be easily inserted at an arbitrary site in an arithmetic pipeline system including the self-synchronous data transmission lines 711, 712 and the combinational circuits 721, 722. This makes it possible to maintain high arithmetic throughput of the arithmetic pipeline system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A self-synchronous FIFO memory device having a plurality of self-synchronous data transmission lines each composed of a self-synchronous signal control circuit and a data hold circuit, the self-synchronous FIFO memory device comprising:

a parallel structure in which the plurality of self-synchronous data transmission lines are connected in parallel;

an input control section for selecting one of the self-synchronous data transmission lines contained in the parallel structure and then outputting to the selected self-synchronous data transmission line a first transfer request signal inputted from a preceding-stage section, and for outputting to the preceding-stage section a first acknowledge signal outputted from the selected self-synchronous data transmission line, and further for, given a state that data transfer toward the selected self-synchronous data transmission line is enabled, outputting, to the selected self-synchronous data transmission line, input data inputted from the preceding-stage section; and an output control section for selecting one of the self-synchronous data transmission lines contained in the parallel structure and then outputting to a succeeding-stage section a second transfer request signal outputted from the selected self-synchronous data transmission line, and for outputting to the selected self-synchronous data transmission line a second acknowledge signal inputted from the succeeding-stage section, and further for, given a state that data transfer toward the succeeding-stage section is enabled, outputting, to the succeeding-stage section, output data outputted from the selected self-synchronous data transmission line.

2. The self-synchronous FIFO memory device according to claim 1, wherein the input control section has:

a sequencer for selecting a transmission path for the first transfer request signal toward the self-synchronous data transmission line contained in the parallel structure as well as a transmission path for the first acknowledge signal derived from the self-synchronous data transmission lines forming the parallel structure and further for distributing the input data to the self-synchronous data transmission lines forming the parallel structure.

3. The self-synchronous FIFO memory device according to claim 2, wherein the input control section further includes at an input stage a self-synchronous data transmission line composed of a self-synchronous signal control circuit and a data hold circuit, and the self-synchronous data transmission line transfers the first transfer request signal and the first acknowledge signal between the preceding-stage section and an internal circuit containing the sequencer of the input control section.

4. The self-synchronous FIFO memory device according to claim 1, wherein the output control section has:

a sequencer for selecting a transmission path for the second transfer request signal derived from the self-synchronous data transmission lines contained in the parallel structure as well as a transmission path for the second acknowledge signal toward the self-synchronous data transmission line contained in the parallel structure and further for selecting output data outputted from the self-synchronous data transmission line contained in the parallel structure.

5. The self-synchronous FIFO memory device according to claim 4, wherein the output control section further includes at an output stage a self-synchronous data transmission line composed of a self-synchronous signal control circuit and a data hold circuit, and the self-synchronous data transmission line transfers the second transfer request signal and the second acknowledge signal between the succeeding-stage section and an internal circuit containing the sequencer of the output control section.

6. The self-synchronous FIFO memory device according to claim 1, further comprising:

an input terminal to which a storage capacity control signal for changing storable data amount is inputted.

7. The self-synchronous FIFO memory device according to claim 6, wherein
the input control section has a sequencer for selecting a transmission path for the first transfer request signal as well as a transmission path for the first acknowledge signal and further for distributing input data, the sequencer having an input terminal for the storage capacity control signal.

8. The self-synchronous FIFO memory device according to claim 6, wherein
the output control section has a sequencer for selecting a transmission path for the second transfer request signal as well as a transmission path for the second acknowledge signal and further for selecting the output data, the sequencer having an input terminal for the storage capacity control signal.

9. The self-synchronous FIFO memory device according to claim 6, wherein
the storage capacity control signal includes a number of data pieces that can be stored between the input control section and the output control section.

10. The self-synchronous FIFO memory device according to claim 6, wherein
the input control section receives the storage capacity control signal including a number of data pieces that can be stored between the input control section and the output control section.

11. The self-synchronous FIFO memory device according to claim 6, wherein
the output control section receives the storage capacity control signal including a number of data pieces that can be retrieved from between the input control section and the output control section.

12. A method for processing data using a self-synchronous FIFO memory device having a plurality of self-synchronous data transmission lines each composed of a self-synchronous signal control circuit and a data hold circuit, the self-synchronous FIFO memory device comprising:
providing for a parallel structure in which the plurality of self-synchronous data transmission lines are connected in parallel;
selecting, by an input control section, one of the self-synchronous data transmission lines contained in the parallel structure and then outputting to the selected self-synchronous data transmission line a first transfer request signal inputted from a preceding-stage section, and for outputting to the preceding-stage section a first acknowledge signal outputted from the selected self-synchronous data transmission line, and further for, given a state that data transfer toward the selected self-synchronous data transmission line is enabled, outputting, to the selected self-synchronous data transmission line, input data inputted from the preceding-stage section; and
selecting, by an output control section, one of the self-synchronous data transmission lines contained in the parallel structure and then outputting to a succeeding-stage section a second transfer request signal outputted from the selected self-synchronous data transmission line, and for outputting to the selected self-synchronous data transmission line a second acknowledge signal inputted from the succeeding-stage section, and further for, given a state that data transfer toward the succeeding-stage section is enabled, outputting, to the succeeding-stage section, output data outputted from the selected self-synchronous data transmission line.

13. The method of claim 12 wherein the method further includes:
selecting, by a sequencer in the input control section, a transmission path for the first transfer request signal toward the self-synchronous data transmission line contained in the parallel structure as well as a transmission path for the first acknowledge signal derived from the self-synchronous data transmission lines forming the parallel structure and further for distributing the input data to the self-synchronous data transmission lines forming the parallel structure.

14. The method of claim 13, wherein the method further includes:
providing for the input control section to further include at an input stage a self-synchronous data transmission line composed of a self-synchronous signal control circuit and a data hold circuit; and
transferring, by the self-synchronous data transmission line, the first transfer request signal and the first acknowledge signal between the preceding-stage section and an internal circuit containing the sequencer of the input control section.

15. The method of claim 12, wherein the method further includes:
selecting, by a sequencer in the output control section, a transmission path for the second transfer request signal derived from the self-synchronous data transmission lines contained in the parallel structure as well as a transmission path for the second acknowledge signal toward the self-synchronous data transmission line contained in the parallel structure and further for selecting output data outputted from the self-synchronous data transmission line contained in the parallel structure.

16. The method of claim 15, wherein the method further includes:
providing for the output control section to include at an output stage a self-synchronous data transmission line composed of a self-synchronous signal control circuit and a data hold circuit; and
transferring, by the self-synchronous data transmission line, the second transfer request signal and a second acknowledge signal between the succeeding-stage section and an internal circuit containing the sequencer of the output control section.

17. The method of claim 12, further comprising:
inputting, by an input terminal, a storage capacity control signal for changing storable data amount.

18. The method of claim 17, the method further comprising:
selecting, by a sequencer in the input control section, a transmission path for the first transfer request signal as well as a transmission path for the first acknowledge signal and further for distributing input data, the sequencer having an input terminal for the storage capacity control signal.

19. The method of claim 17, the method further comprising:
selecting, by a sequencer in the output control section, a transmission path for the second transfer request signal as well as a transmission path for the second acknowledge signal and further for selecting the output data, the sequencer having an input terminal for the storage capacity control signal.

20. A self-synchronous FIFO memory device having a plurality of self-synchronous data transmission lines each composed of a self-synchronous signal control circuit and a data hold circuit, the self-synchronous FIFO memory device comprising:

a parallel structure in which the plurality of self-synchronous data transmission lines are connected in parallel;

an input control section for selecting one of the self-synchronous data transmission lines contained in the parallel structure and then outputting to the selected self-synchronous data transmission line a first transfer request signal inputted from a preceding-stage section, and for outputting to the preceding-stage section a first acknowledge signal outputted from the selected self-synchronous data transmission line, and further for, given a state that data transfer toward the selected self-synchronous data transmission line is enabled, outputting, to the selected self-synchronous data transmission line, input data inputted from the preceding-stage section; and an output control section for selecting one of the self-synchronous data transmission lines contained in the parallel structure and then outputting to a succeeding-stage section a second transfer request signal outputted from the selected self-synchronous data transmission line, and for outputting to the selected self-synchronous data transmission line a second acknowledge signal inputted from the succeeding-stage section, and further for, given a state that data transfer toward the succeeding-stage section is enabled, outputting, to the succeeding-stage section, output data outputted from the selected self-synchronous data transmission line, wherein the input control section includes a self-synchronous data transmission line and the output control section includes a self-synchronous data transmission line.

21. A method for processing data using a self-synchronous FIFO memory device having a plurality of self-synchronous data transmission lines each composed of a self-synchronous signal control circuit and a data hold circuit, the self-synchronous FIFO memory device comprising:

providing for a parallel structure in which the plurality of self-synchronous data transmission lines are connected in parallel;

selecting, by an input control section, one of the self-synchronous data transmission lines contained in the parallel structure and then outputting to the selected self-synchronous data transmission line a first transfer request signal inputted from a preceding-stage section, and for outputting to the preceding-stage section a first acknowledge signal outputted from the selected self-synchronous data transmission line, and further for, given a state that data transfer toward the selected self-synchronous data transmission line is enabled, outputting, to the selected self-synchronous data transmission line, input data inputted from the preceding-stage section; and selecting, by an output control section, one of the self-synchronous data transmission lines contained in the parallel structure and then outputting to a succeeding-stage section a second transfer request signal outputted from the selected self-synchronous data transmission line, and for outputting to the selected self-synchronous data transmission line a second acknowledge signal inputted from the succeeding-stage section, and further for, given a state that data transfer toward the succeeding-stage section is enabled, outputting, to the succeeding-stage section, output data outputted from the selected self-synchronous data transmission line, wherein, the input control section includes a self-synchronous data transmission line and the output control section includes a self-synchronous data transmission line.

* * * * *